(12) United States Patent
Xia et al.

(10) Patent No.: US 11,663,826 B2
(45) Date of Patent: May 30, 2023

(54) METHOD AND APPARATUS FOR DATA PROCESSING, AND METHOD AND APPARATUS FOR VIDEO COVER GENERATION

(71) Applicant: Alibaba Group Holding Limited, Grand Cayman (KY)

(72) Inventors: Zhurong Xia, Hangzhou (CN); Shiwei Zhang, Hangzhou (CN); Zhiyuan Geng, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 17/104,765

(22) Filed: Nov. 25, 2020

(65) Prior Publication Data
US 2021/0201046 A1    Jul. 1, 2021

(30) Foreign Application Priority Data

Dec. 30, 2019 (CN) .......................... 201911395451.9

(51) Int. Cl.
*G06V 20/40* (2022.01)
*G11B 27/034* (2006.01)
*G11B 27/34* (2006.01)

(52) U.S. Cl.
CPC .............. *G06V 20/47* (2022.01); *G06V 20/49* (2022.01); *G11B 27/034* (2013.01); *G11B 27/34* (2013.01)

(58) Field of Classification Search
CPC ........... G06K 9/00751; G06K 9/00765; G11B 27/034; G11B 27/34; G11B 27/031; H04N 21/234; H04N 21/23418; H04N 21/2393; H04N 21/4312
See application file for complete search history.

(56) References Cited

U.S. PATENT DOCUMENTS

| | | | |
|---|---|---|---|
| 7,558,472 B2 | 7/2009 | Locket et al. | |
| 8,839,290 B2 | 9/2014 | Roberts et al. | |
| 8,990,861 B2 | 3/2015 | Nishikawa et al. | |
| 9,232,271 B2 | 1/2016 | Soroushian | |
| 10,014,008 B2 | 7/2018 | Cho et al. | |
| 10,198,509 B2 | 2/2019 | Cheng et al. | |
| 10,679,063 B2 | 6/2020 | Cheng et al. | |
| 2006/0080716 A1 | 4/2006 | Nishikawa et al. | |
| 2007/0203942 A1* | 8/2007 | Hua ..................... | G06F 16/745 |
| 2008/0250327 A1 | 10/2008 | Li et al. | |
| 2009/0313545 A1 | 12/2009 | Kim et al. | |

(Continued)

*Primary Examiner* — Girumsew Wendmagegn
(74) *Attorney, Agent, or Firm* — James J. DeCarlo; Greenberg Traurig, LLP

(57) ABSTRACT

Embodiments of the disclosure provides methods and apparatuses for data processing and video cover generation. The method for video cover generation comprises: receiving a video for processing, a processing request for the video, and a video cover generation condition; segmenting the video based on the processing request to obtain a sequence of target clips; scoring target clips in the sequence of target clips based on a pre-configured algorithm to obtain scores for the target clips; after weighting the scores of target clips satisfying the video cover generation condition, weighting the scores of target clips associated with a video category of the video; and generating, based on a weighting process result, a personalized video cover attracting more user attention.

17 Claims, 14 Drawing Sheets

(56) References Cited

U.S. PATENT DOCUMENTS

| | | | |
|---|---|---|---|
| 2010/0251121 A1 | 9/2010 | Rosser et al. | |
| 2011/0307924 A1* | 12/2011 | Roberts | H04N 21/2668 |
| | | | 725/44 |
| 2014/0002484 A1* | 1/2014 | Lynch | G09B 5/062 |
| | | | 345/619 |
| 2015/0234833 A1* | 8/2015 | Cremer | G06F 16/60 |
| | | | 707/626 |
| 2016/0100226 A1 | 4/2016 | Sadler et al. | |
| 2019/0163981 A1* | 5/2019 | Yu | G06K 9/00751 |
| 2020/0142928 A1 | 5/2020 | Mei et al. | |
| 2020/0195983 A1 | 6/2020 | Chao | |

* cited by examiner

METHOD AND APPARATUS FOR DATA PROCESSING, AND METHOD AND APPARATUS FOR VIDEO COVER GENERATION

CROSS-REFERENCE TO RELATED APPLICATIONS

The present application claims the benefit of priority to Chinese Patent Application No. 201911395451.9, filed on Dec. 30, 2019, which is incorporated herein by reference in its entirety.

BACKGROUND

Technical Field

The disclosure relates to the technical field of computers, and in particular, to methods and apparatuses for data processing, methods and apparatuses for video cover generation, and methods, computing devices, computer-readable storage media for video editing.

Description of Related Art

With the rising popularity of Internet videos, more and more people are spending a significant amount of time watching online videos on major Internet video platforms, as well as publishing self-made videos. Before publishing a video, an Internet video platform selects an image from the video as a video cover for the video and then publishes the video with the cover. As a video cover serves to identify the displayed video content, such a video cover is important.

However, current Internet video platforms typically use the first frame of a video as the cover or randomly select an image from the video as the cover. As such, these covers fail to attract users' attention, resulting in a low click rate on videos. Further, when publishing videos on an Internet video platform, users are not able to generate customized video covers, leading to poor user experiences. Therefore, there exists a need for generating a video cover to attract more user attention and increase the click rate on videos.

SUMMARY

Embodiments of the disclosure provide methods, apparatuses, and computing devices for data processing, methods, apparatuses, and computing devices for video cover generation, and computer-readable storage media and methods for video editing to solve the technical problems in the present technologies.

In one embodiment, the disclosure provides a method for data processing, the method comprising: obtaining a video for processing and a first request; segmenting the video to obtain one or more original video clips; selecting, based on the first request, one or more first target video clips from the one or more original video clips; and generating a first video cover based on the one or more first target video clips.

In one embodiment, the disclosure provides a method for video cover generation, the method comprising: receiving a video for processing, a processing request for the video, and a video cover generation condition; segmenting the video based on the processing request to obtain a sequence of target clips; scoring target clips in the sequence of target clips based on a preconfigured algorithm to obtain scores of the target clips; after weighting the scores of target clips satisfying the video cover generation condition, weighting the scores of target clips associated with a video category of the video; and generating a video cover based on a weighting process result.

In one embodiment, the disclosure provides a method for video cover generation at a server, the method comprising: receiving a video for processing uploaded by a client and a processing request for the video from the client; segmenting the video based on the processing request to obtain a sequence of target clips; scoring target clips in the sequence of target clips based on a preconfigured algorithm to obtain scores of the target clips; weighting the scores of the target clips associated with a video category of the video; and generating a video cover based on a weighting process result.

In one embodiment, the disclosure provides a method for video cover generation at a client, the method comprising: uploading to a server a video for processing, a processing request for the video, and a video cover generation condition; and receiving and displaying a video cover generated by the server based on the video, the processing request, and the video cover generation condition.

In one embodiment, the disclosure provides an apparatus for data processing, the apparatus comprising: a request obtaining module configured to obtain a video for processing and a first request; a video segmentation module configured to segment the video to obtain one or more original video clips; selecting module configured to select, based on the first request, one or more first target video clips from the one or more original video clips; and a first video cover generation module configured to generate a first video cover based on the one or more first target video clips.

In one embodiment, the disclosure provides an apparatus for video cover generation, the apparatus comprising: a first receiving module configured to receive a video for processing, a processing request for the video, and a video cover generation condition; a first segmentation module configured to segment the video based on the processing request to obtain a sequence of target clips; a first scoring module configured to score target clips in the sequence of target clips based on a preconfigured algorithm to obtain scores of the target clips; and a first video cover generation module configured to, after weighting the scores of target clips that satisfy the video cover generation condition, weight the scores of target clips associated with a video category of the video, and generate a video cover based on a weighting process result.

In one embodiment, the disclosure provides disclosure an apparatus for video cover generation at a server, the apparatus comprising: a second receiving module configured to receive a video for processing uploaded by a client and a processing request for the video from the client; a second segmentation module configured to segment the video based on the processing request to obtain a sequence of target clips; a second scoring module configured to score target clips in the sequence of target clips based on a preconfigured algorithm to obtain scores of the target clips; and a second video cover generation module configured to weight the scores of target clips associated with a video category of the video, and generate a video cover based on a weighting process result.

In one embodiment, the disclosure provides an apparatus for video cover generation at a client, the apparatus comprising: a sending module configured to upload to a server a video for processing, a processing request for the video, and a video cover generation condition; and a third receiving module configured to receive and display a video cover generated by the server based on the video, the processing request, and the video cover generation condition.

In one embodiment, the disclosure provides a computing device, the computing device comprising a processor and a memory, wherein the memory is configured to store a program, when executed by the processor, instructing the computing device to: obtain a video for processing and a first request; segment the video to obtain one or more original video clips; select, based on the first request, one or more first target video clips from the one or more original video clips; and generate a first video cover based on the one or more first target video clips.

In one embodiment, the disclosure provides a computing device, the computing device comprising: a memory and a processor, wherein the memory is configured to store computer-executable instructions, when executed by the processor, instructing the computing device to receive a video for processing, a processing request for the video, and a video cover generation condition; segment the video based on the processing request to obtain a sequence of target clips; score target clips in the sequence of target clips based on a preconfigured algorithm to obtain scores of the target clips; after weighting the scores of target clips that satisfy the video cover generation condition, weight the scores of target clips associated with a video category of the video; and generate the video cover based on a weighting process result.

In one embodiment, the disclosure provides a computing device, the computing device comprising: a processor and a memory, wherein the memory is configured to store a program, when executed by the processor, instructing the computing device to receive a video for processing uploaded by a client and a processing request for the video from the client; segment the video based on the processing request to obtain a sequence of target clips; score target clips in the sequence of target clips based on a preconfigured algorithm to obtain scores of the target clips; weight the scores of target clips associated with a video category of the video; and generate the video cover based on a weighting process result.

In one embodiment, the disclosure provides a computing device, the computing device comprising a processor and a memory, wherein the memory is configured to store a program, when executed by the processor, instructing the computing device to upload to a server a video for processing, a processing request for the video, and a video cover generation condition; and receive and display a video cover generated by the server based on the video, the processing request, and the video cover generation condition.

In one embodiment, the disclosure provides a computer-readable storage medium for storing computer-executable instructions when executed by a processor, causing the processor to perform the methods for video cover generation of the disclosure as described above.

In one embodiment, the disclosure provides a method for video editing, the method comprising the methods for video cover generation of the disclosure as described above.

Embodiments of the disclosure provide methods and apparatuses for video cover generation. In one embodiment, a method for video cover generation comprises: receiving a video for processing, a processing request for the video, and a video cover generation condition; segmenting the video based on the processing request to obtain a sequence of target clips; scoring target clips in the sequence of target clips based on a preconfigured algorithm to obtain scores of the target clips; after weighting the scores of target clips that satisfy the video cover generation condition, weighting the scores of target clips associated with a video category of the video; and generating a video cover based on a weighting process result.

With the methods for video cover generation provided by the disclosure, an uploaded video for processing is segmented, and target clips resulting from the segmentation are scored. After the scores of the target clips satisfying the video cover generation condition are obtained, the target clips are weighted based on a category of the video to generate a video cover. Therefore, with the participation of a user, the request of the user is satisfied to a maximized extent while generating personalized video covers. Additionally, based on the personalized video cover, a video cover capable of attracting more user attention and increasing the click rate of the video is further generated based on the category of the video.

DETAILED DESCRIPTION

Specific details are set forth in the following description to facilitate a full understanding of the disclosure. However, the disclosure can be implemented in other manners than that described herein, and those skilled in the art can make similar derivations without departing from the essence of the disclosure. Therefore, the disclosure is not limited by the specific implementations disclosed below.

The terms used in one or more embodiments of the disclosure are for the purpose of describing embodiments only and are not intended to limit the disclosure. The singular forms "a," "said," and "the" used in one or more embodiments of the disclosure and in the appended claims are also intended to include plural forms unless the context clearly indicates otherwise. It should also be understood that the term "and/or" used in one or more embodiments of the disclosure refers to and includes any or all possible combinations of one or more associated listed items.

It should be understood that although terms such as first and second may be used to describe various information in one or more embodiments of the disclosure, such information should not be limited to these terms. These terms are only used to distinguish one type of information from another type of information. For example, "first" may also be referred to as "second," and similarly, "second" may also be referred to as "first" without departing from the scope of one or more embodiments of the disclosure. Depending on the context, the word "if" as used herein may be construed as meaning "when . . . " or "upon . . . " or "in response to determining."

As used herein, a video cover refers to a static or dynamic image used as a cover when a video is displayed on a PC or a mobile device to attract users to click on the video.

As used herein, a static video cover refers to a video cover that is a single static image.

As used herein, a dynamic video cover refers to a video cover that can be dynamically displayed (e.g., an image in the Graphics Interchange Format (GIF), a short video, and the like).

As used herein, an intelligent video cover generation refers to the use of artificial intelligence (AI) to automatically and intelligently select one image frame from an original video as a static video cover or combine several frames into a dynamic video cover.

As used herein, an interactive video cover generation refers to generating a video cover based on interactions with a user, with a priority given to satisfying the requests of the user, after which a cover is generated using an intelligent method.

As used herein, video structuralization refers to a process of using a video tagging algorithm to assign algorithm tags to image frames or shots in a video, based on various dimensions (e.g., a common tag, a landmark tag, facial recognition, action recognition, object detection, and the like).

Figure 1:
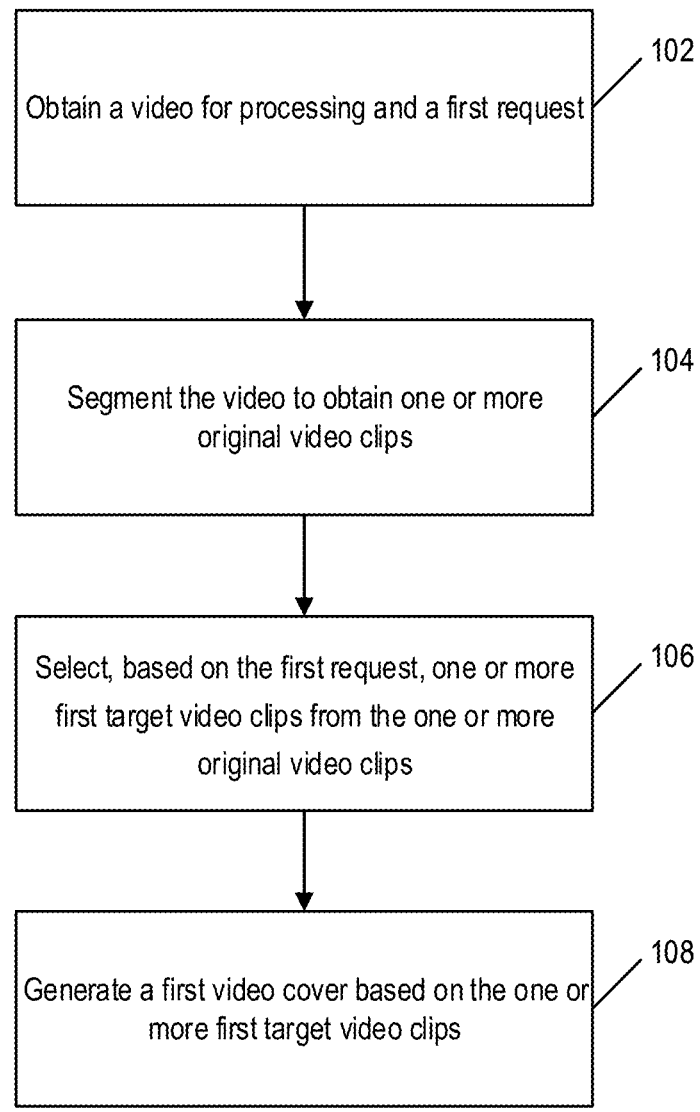
FIG. 1 is a flow diagram illustrating a method for data processing according to some embodiments of the disclosure.

FIG. 1 is a flow diagram illustrating a method for data processing according to some embodiments of the disclosure. In some embodiments and as shown in FIG. 1, the method for data processing includes the following steps.

Step 102: obtain a video for processing and a first request. In some embodiments, the first request is preconfigured or is input by a user.

Step 104: segment the video to obtain one or more original video clips.

Step 106: select, based on the first request, one or more first target video clips from the one or more original video clips.

In some embodiments, selecting, based on the first request, one or more first target video clips from one or more original video clips includes the following.

First, one or more original video clips are scored based on the first request. Second, one or more original video clips corresponding to a video category of the video are weighted. Lastly, one or more first target video clips are selected from all of the weighted one or more original video clips.

Step 108: generate a first video cover based on the one or more first target video clips.

In some embodiments, the selecting of one or more first target video clips from all the weighted one or more original video clips includes ranking all of the weighted one or more original video clips based on their final scores and selecting one or more first target video clips ranked towards the top position to generate the first video cover.

In some embodiments, the method for data further includes obtaining a second request based on the user input; selecting, based on the second request, one or more second target video clips from the one or more original video clips; and generating a second video cover based on the one or more second target video clips.

In implementations, the selecting of one or more second target video clips from the one or more original video clips is substantially similar to those of selecting the one or more first target video clips, details of which are not repeated herein.

In some embodiments, after the first video cover and the second video cover are generated, the first video cover and the second video cover are displayed simultaneously.

In some embodiments, the attribute feature(s) of a user is (are) also taken into account in the generation of the first video cover and the second video cover. Non-limiting examples of the attribute features include a geographic location, a personal preference, a historical shopping habit, and the like of the user. This way, during the video cover generation, a video cover more personalized, and user-attention attracting is generated based on the attribute feature(s) of the user.

In some embodiments, after the video for processing is obtained, the first video cover attracting more user attention is automatically generated based on the first request, without the involvement of the user. Further, after the second request input by the user is obtained, the personalized second video cover satisfying the request of the user to a maximized extent is generated with the participation of the user, thereby improving user experiences.

In some embodiments, before obtaining a second request based on the user's input, the method further includes obtaining an attribute feature of the user, based on which a corresponding template for video cover generation is generated for the user.

Correspondingly, obtaining a second request based on the user input includes receiving the user's input based on the template for video cover generation to obtain the second request.

According to various embodiments, the user includes, but is not limited to, an individual user, a company, an organization, and the like. If the user is an individual user, the attribute feature(s) of the user include(s), but is not limited to, a geographic location, a historical shopping habit of the user, and personal preferences. If the user is a company or an organization, the attribute feature(s) of the user includes, but is not limited to, a registered address of the company or organization, the type of the company or organization, and the registered capital of the company or organization, etc.

In implementations, for different user attribute feature(s), different corresponding templates for video cover generation are generated for the users. For example, for an individual User A, the attribute feature of User A suggests "snack buying" as a historical shopping habit. As such, a corresponding template for video cover generation generated for User A includes a selection condition of "gourmet food." Subsequently, video covers featuring various gourmet food are generated based on the template for video cover generation. For another example, for a user as Company B, the attribute feature of Company B suggests that the type of Company B belongs to the industry of "film and television." As such, a corresponding template for video cover generation generated for Company B includes selection conditions of "celebrity" and "scene image." Subsequently, a video cover featuring a celebrity and a scene image is generated based on the template for video cover generation.

In some embodiments, receiving the user's input based on the template for video cover generation to obtain the second request is implemented by the user selecting selection condition(s) for a video cover to be generated based on the template for video cover generation, generating the second request.

According to various embodiments of the disclosure, the method for data processing includes: obtaining an attribute feature of the user to generate a corresponding template for video cover generation for the user based on the attribute feature; receiving the user's input based on the template for video cover generation to obtain the second request; selecting, based on the second request, one or more second target video clips from the one or more original video clips; and generating a second video cover based on the one or more second target video clips. This way, the attribute feature(s) of the user is(are) taken into account during the video cover generation such that the video cover preferred by the user is generated based on such attribute feature(s), thereby enhancing user experiences.

In some embodiments, before obtaining a second request based on the user's input, the method further includes obtaining a feature associated with generating a historical video cover for a second user associated with the user (e.g., associated user).

Correspondingly, the selecting, based on the second request, one or more second target video clips from the one or more original video clips includes receiving the user's input based on the feature associated with generating a historical video cover to obtain the second request.

In some embodiments, the second user is any user having a relationship with the user. For example, the user and the associated user may be in a relationship in the forms of relatives, friends, girlfriends/boyfriends, partners, and so on. In some embodiments, the feature for generating a historical video cover for the associated user includes, but is not limited to, selection conditions applied to generating the historical video covers for the associated user, style(s) of video cover(s) generated for the associated user, and so on.

In implementations, due to the relationship between the user and the associated user, typically, there are common interests and habits between the user and the associated user in a close relationship. As such, after the feature for generating a historical video cover for the associated user is obtained, the user's input is received, based on the recommended historical video cover(s) of the associated user, to obtain the second request, thereby greatly enhancing positive impressions upon and improving convenience for the user.

Figure 2:
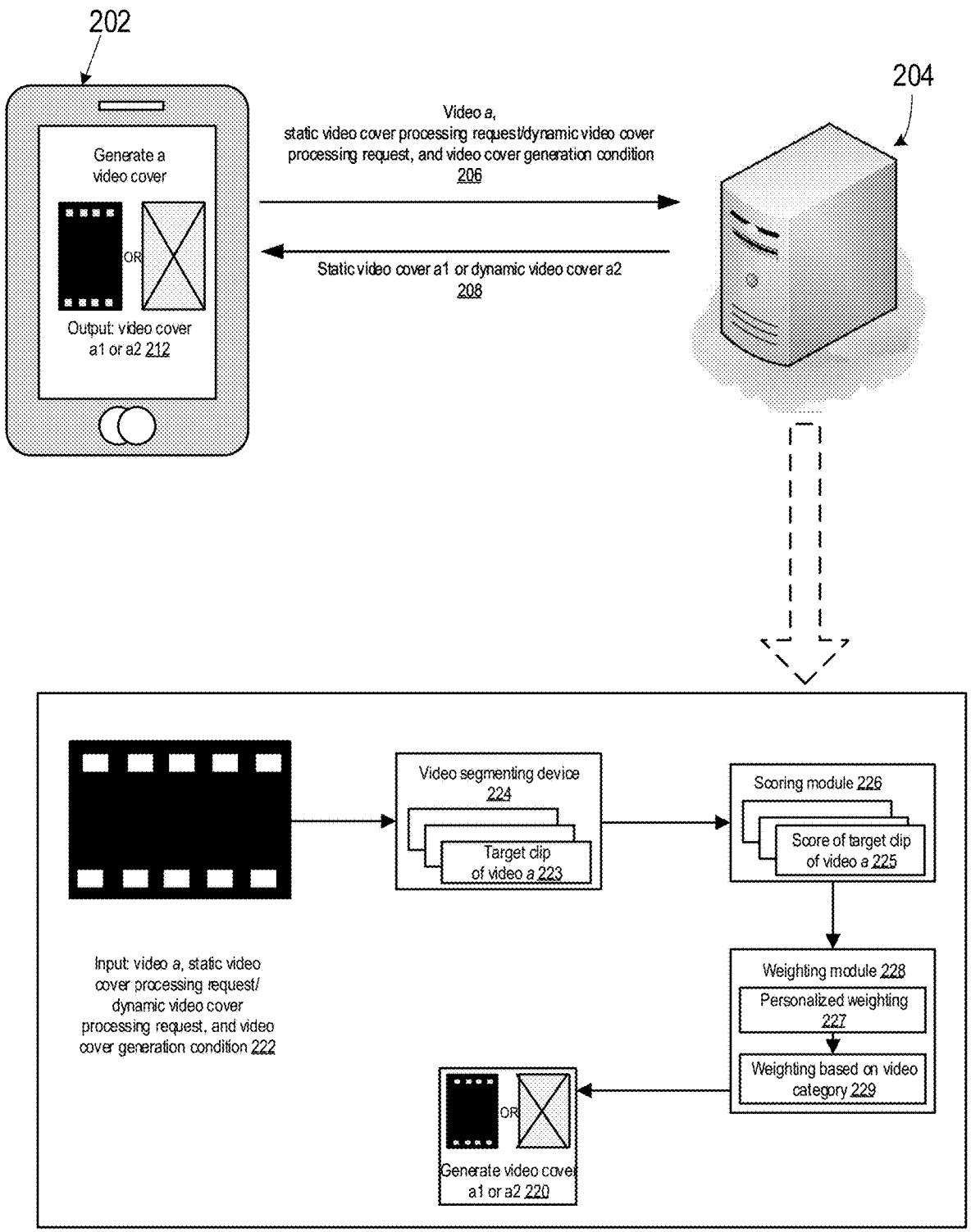
FIG. 2 is a block diagram illustrating an application scenario of a method for video cover generation according to some embodiments of the disclosure.

FIG. 2 is a block diagram illustrating an exemplary application scenario for video cover generation according to some embodiments of the disclosure. In some embodiments and as shown in FIG. 2, the system implementing the exemplary application scenario includes a client (202) and a server (204). In some embodiments, the server (204) is configured to perform the following steps.

Step I: receive a video for processing, a processing request for the video, and a video cover generation condition.

Step II: segment the video based on the processing request to obtain a sequence of target clips sequence.

Step III: score the target clips in the sequence of target clips based on a preconfigured algorithm to obtain the scores for the target clips.

Step IV: after weighting the scores of the target clips satisfying a video cover generation condition, weight the scores of target clips associated with a video category of the video to generate the video cover based on a weighting process result.

Still referring to FIG. 2, the client (202) sends (206) to the server (204) a video a for processing, a static or dynamic video cover processing request for Video A, and a video cover generation condition.

After receiving (222) the Video A, the static or dynamic video cover processing request for Video A, and the video cover generation condition, the server (204) first uses a video segmenting device (224) to segment Video A into target clips (223), then scores the target clips of Video A based on a preconfigured algorithm applied by a scoring module (226) to obtain a respective score (225) for each target clip. Next, the server (204) assigns weights to, utilizing a weighting module (228), the target clips satisfying a weighting condition. In one embodiment, after the scores of the target clips satisfying the video cover generation condition (e.g., personalized weighting (227) in FIG. 2) are weighted, the scores of the target clips associated with the video category of the video are weighted (229). Finally, a video cover A1 or A2 is generated (220) based on the weighting process result.

As shown in the embodiment illustrated in FIG. 2, the server (204) returns (208) the generated video cover to the client (202), and the client (202) receives and displays the generated video cover (212).

In some embodiments, weighting the scores of target clips satisfying the video cover generation condition includes assigning weights to the target clips satisfying the video cover generation condition to obtain the initial scores of the target clips satisfying the video cover generation condition.

In some embodiments, after obtaining the initial scores of the target clips satisfying the video cover generation condition, the weighting process assigns weights to the scores of the target clips associated with a video category of the video. In some embodiments, generating the video cover based on a result of the weighting process includes the following steps.

Step 1: denote the first target clips satisfying the video cover generation condition as the third target clips, and denoting the first target clips not satisfying the video cover generation condition as the fourth target clips.

Step 2: weight the initial scores of the third target clips to obtain the target scores of the third target clips, and weighting the scores of the fourth target clips to obtain the target scores of the fourth target clips.

Step 3: denote the second target clips satisfying the video cover generation condition as the fifth target clips and denoting the second target clips not satisfying the video cover generation condition as the sixth target clips.

Step 4: rank the third target clips, the fourth target clips, the fifth target clips, and the sixth target clips based on the target scores of the third target clips, the initial scores of the fourth target clips, the initial scores of the fifth target clips, and the scores of the sixth target clips.

Step 5: generate the video cover based on a ranking result. Here, in this example, the first target clips and the second target clips constitute the sequence of target clips; the third target clips and the fourth target clips constitute the first target clips; the fifth target clips and the sixth target clips constitute the second target clips; and the first target clips are associated with the video category of the video.

With the method for video cover generation provided by embodiments of the disclosure, after the video is segmented into the target clips based on the processing request, the target clips are scored. Subsequently, the scores of the target clips satisfying the video cover generation condition are first weighted based on the one or more customized video cover generation conditions. After the customized conditions are satisfied, the scores of the target clips associated with the video category of the video are weighted based on the video category. This way, with the user participating in the video cover generation, the request of the user can be satisfied to a maximized extent, and thereby generating personalized video covers. Further, the video category is also taken into account as an influencing factor such that the personalized video covers are generated, to a maximized extent, to attract more users' attention, thereby increasing the click rate on the video.

Figure 3:
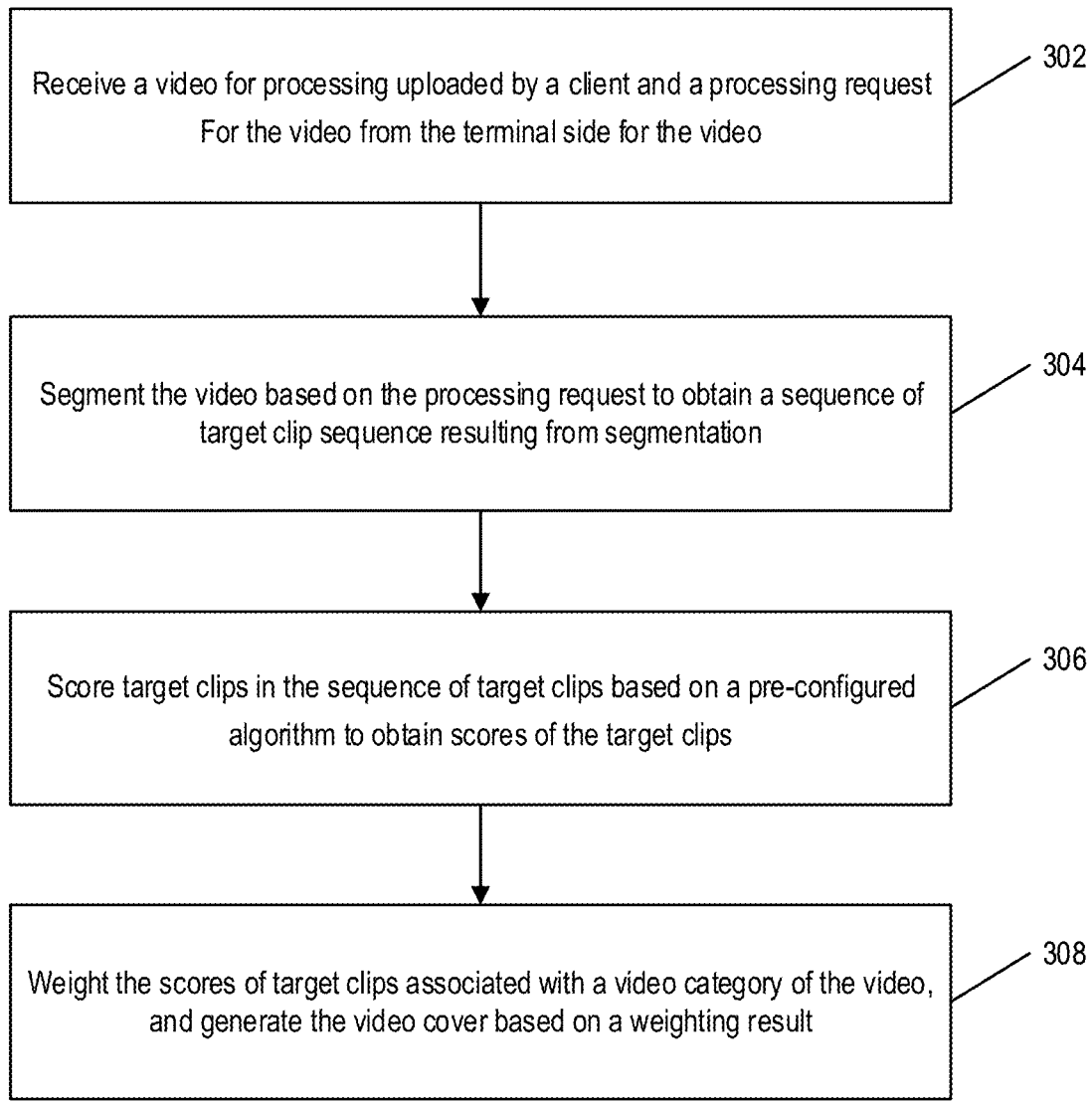
FIG. 3 is a flow diagram illustrating a method for video cover generation at a server according to some embodiments of the disclosure.

FIG. 3 is a flow diagram illustrating a method for video cover generation at a server according to some embodiments of the disclosure. In some embodiments and as shown herein, the method for video cover generation includes the following steps.

Step 302: receive a video for processing uploaded by a client and a processing request for the video from the client.

In some embodiments, the video includes, but is not limited to, an advertisement video, a gourmet food video, a popular science video, a sports video, a melodramatic video, etc.

In some embodiments, the processing request for the video includes a format request by the client regarding the video cover. For example, for the video, the client can request that either a static video cover or a dynamic video cover be generated.

In implementations, receiving a video for processing uploaded by a client and a processing request for the video from the client is implemented by receiving a video (which is for processing and is of a video type) uploaded by a user via the client, and receiving a processing request uploaded by the user via the client to generate a static video cover or a dynamic video cover for the video of the video type.

In some embodiments, the processing request of the user for the video is generated by the user performing a clicking operation at a personal computer (PC) or a mobile device. In one example, the user clicks, on the PC or the mobile device, a button associated with generating a static video cover or generating a dynamic video cover, to generate the processing request. In another example, the user performs voice input at the PC or the mobile device to generate the processing request. For instance, the user inputs a voice instruction by using a voice record/input system on the PC or the mobile device. In processing request of the user for the video can be generated in any suitable manner, without limitation.

Step 304: segment the video based on the processing request to obtain a sequence of target clips, as a result of the segmentation.

In some embodiments, for different formats requested for the video covers included in the processing request, different segmentations are performed on the videos. Therefore, the segmentation of the video is determined based on the processing request of the user.

In some embodiments, segmenting the video based on the processing request to obtain a sequence of target clips includes determining a segmentation method for the video based on the processing request and segmenting the video based on the segmentation method to obtain the sequence of target clips.

In implementations, the format requested by the client in the processing request specifies the video cover as a static or dynamic cover.

If the format request of the client on the video cover is static, determining a segmentation method for the video based on the processing request and segmenting the video based on the segmentation method to obtain the sequence of target clips includes determining a video frame segmentation method for the video based on the static request on the video cover and segmenting the video based on the video frame segmentation method to obtain a target sequence of video frames.

As described above, if the format request of the client on the video cover of the video is static, it is determined that the request of the client on the video cover of the video is a static video cover request. In various embodiments, the generation of a static video cover requires that the video is segmented into single-framed videos. Therefore, it is determined that the segmentation method for the video is a video frame segmentation method. In implementations, the video can be segmented into a plurality of single-framed videos based on any suitable video frame segmentation method capable of segmenting the video into single-framed videos. The plurality of single-framed videos constitutes a target sequence of video frames. In one example, a single-framed video includes a single video image of the smallest unit in the video.

If the format request of the client on the video cover is dynamic, determining a segmentation method for the video based on the processing request and segmenting the video based on the segmentation method to obtain the sequence of target clips includes determining a shot segmentation method for the video based on the dynamic request for the video cover and segmenting the video based on the shot segmentation method to obtain a sequence of target shots.

As described above, if the format request of the client on the video cover for the video is dynamic, it is determined that the request of the client on the video cover of the video is a dynamic video cover request. In various embodiments, the generation of a dynamic video cover requires that the video is segmented into shots. Therefore, it is determined that the segmentation method of the video is a shot segmentation method. In implementations, the video can be segmented into a plurality of shots based on any suitable shot segmentation method capable of segmenting the video into individual shots. The plurality of shots constitutes a sequence of target shots. In one example, a shot is a video shot, including the video content obtained by editing the videos of the same subject in the same scene captured by different cameras at the same time.

In some embodiments, to segment the video into single frames or shots more accurately, the video is segmented by using a Scene Boundary Detection (SBD) algorithm based on a two-layer sliding window.

Step 306: score the target clips in the sequence of target clips based on a preconfigured algorithm to obtain the scores for the target clips.

In implementations, if the sequence of target clips is a sequence of target video frames or a sequence of target shots, the target clips in the sequence of target clips are scored based on the preconfigured algorithm to obtain the scores of the target clips. That is, the target video frames in the sequence of target video frames are scored based on the preconfigured algorithm to obtain the scores for the target video frames. Alternatively, the target shots in the sequence of target shots are scored based on the preconfigured algorithm to obtain the scores of the target shots.

In implementations, the scoring the target video frames based on the preconfigured algorithm is implemented by performing aesthetic scoring on each target video frame based on the preconfigured algorithm; while the scoring the target shots based on the preconfigured algorithm is implemented by scoring a degree of the impressiveness for each target shots based on the preconfigured algorithm. The preconfigured algorithm can be any suitable algorithm capable of performing aesthetic scoring on each target video frame and scoring a degree of the impressiveness of each target scene, without limitation.

In one example, the preconfigured algorithm is a trained neural network model. In application, an aesthetic score of the target video frame or a score of a degree of the impressiveness of the target shot is obtained by inputting a target video frame or a target shot into the neural network model.

Step 308: weight the scores of target clips associated with a video category of the video, and generate the video cover based on a weighting process result.

In implementations, before weighting the scores of target clips associated with a video category of the video, the video category of the video is determined.

In various embodiments, the video categories of the video include but are not limited to the above-described types of advertisement video, gourmet food video, popular science video, sports video, melodramatic video, and so on.

In some embodiments, for different video categories of the videos, different target clips (e.g., the target video frame or the target shots) are required to be weighted. For example, for a video category of a news type, and in implementations, for a news scenario, the audience pays more attention to celebrities (e.g., state leaders, political leaders, and the like). As such, if the video category of the video is news, scores of target clips featuring celebrities are weighted. However, in a sports video, the audience pays more attention to actions (e.g., basketball shooting, spiking, a goal, and the like). As such, if the video category of the video is sports, scores of target clips featuring actions are weighted.

In implementations, to facilitate the subsequent selection of the scores of suitable target clips to perform weighting based on the category of the video, a corresponding tag is preconfigured for each target clip. In one embodiment, before the scoring target clips in the sequence of target clips based on a preconfigured algorithm to obtain the scores for the target clips, the method further includes configuring dimension tags for the target clips in the sequence of target clips based on preconfigured dimensions.

In some embodiments, the preconfigured dimensions include, but are not limited to, celebrity identification, action identification, scene and landmark identification, object identification, and the like.

In implementations, configuring the dimension tags for the target clips based on preconfigured dimensions is implemented by configuring the dimension tags for the target clips based on dimensions such as celebrity identification, action identification, scene, and landmark identification, object identification, and the like. For example, the target clips include a target video frame 1, a target video frame 2, and a target video frame 3. Since target video frame 1 includes a scene in which a political leader A is at an airport of a place B, the dimension tags configured for the target video frame 1 are: "political leader A," "place B," and "airport." Since the target video frame 2 includes a crowd moving forwards in an airport, a dimension tag configured for the target video frame 2 is "airport." Since the target video frame 3 includes a close-up of a smile of an airline stewardess, the dimension tags configured for the target video frame 3 are "airline stewardess" and "smile."

After the dimension tags are configured for the target clips, an association relationship between the video category of the video and the target clips is obtained based on the dimension tags. In some embodiments, after configuring the dimension tags for the target clips in the sequence of target clips based on preconfigured dimensions, the method further includes: obtaining a video dimension, wherein a degree of preference for the video dimension to the video category of the video is greater than a preconfigured preference threshold; and determining, based on a matching relationship between the video dimension and the dimension tags of the target clips, the target clips associated with the video category of the video.

In some embodiments, the preconfigured preference threshold is configured based on actual requirements, without limitation. For example, if the preconfigured preference threshold is configured at 90%, the degrees of preference of the video dimensions to the video category of the video are all greater than 90%.

In some embodiments, the degree of preference is the degree of interest of a user in the video dimensions associated with the video category of the video. For example, for a news video, a user may have a higher preference for celebrity identification dimension, and the like; for a television drama video, a user may have a higher preference for scene and landmark identification dimension, and the like.

In some embodiments, the target clips associated with the video category of the video are the target clips that are of the same video dimensions in the target clip sequence.

In this case, still using the above-described example, after the dimension tags are configured for the target clips based on the preconfigured dimensions, if it is determined that the video category of the video is news, the score of the target clip associated with the video category of the video is weighted. That is, the score of the target video frame 1 associated with the video category of the news video is weighted.

As above-described, the video category of the video affects the target clip required to be weighed. In some embodiments, the selection of the target clip associated with the video is determined based on the degree of attention paid by the audience to the target clip in an actual scenario. In some embodiments, the degree of attention is determined based on the viewing duration of the audience with regard to a historical video category, a click rate, and the like. After the scores of the target clips associated with the video category of the video are weighted, the scores of the target clips associated with the video category of the video change. In one example, weighting the scores of target clips associated with a video category of the video and generating the video cover based on a weighting process result includes: weighting the scores of first target clips associated with the video category of the video to obtain the target scores for the first target clips; ranking, based on the scores of second target clips and the target scores of the first target clips, the first target clips and the second target clips; and generating the video cover based on a ranking result, where the first target clips and the second target clips constitute the sequence of target clips.

In implementations, the first target clips and the second target clips are ranked based on the scores of second target clips in the target clip sequence and the target scores of the first target clips. That is, the first target clips and the second target clips are ranked in descending order based on the scores of second target clips in the target clip sequence and the target scores of the first target clips. Based on the ranking result, top N of the ranked first target clips and/or second target clips are selected to generate the video cover for the video. In some embodiments, when the target clip is a target video frame, top N is set as the top one, e.g., only the top one target video frame is selected as the video cover to generate a static video cover. When the target clip is a target shot, the value of N can be configured based on actual applications, without limitations. In some example, N can be set as 3, 5, or the like.

With the methods for video cover generation provided in embodiments of the disclosure, after a video for processing and a processing request submitted by a client are received, a video for processing is segmented into target clips of different types based on the processing request. Subsequently, the target clips are scored; and based on a video category of the video, target clip(s) associated with the category of most interest to a user is(are) weighted. Afterward, a video cover for the video is automatically generated based on the target clip(s), achieving intelligent video cover generation which attracts more user attention to the video, and increases the click rate upon the video.

In some embodiments, after scoring target clips in the target clip sequence based on a preconfigured algorithm to obtain scores of the target clips, the method further includes: if a video cover generation condition of the client is received, weighting the target clips in the target clip sequence satisfying the video cover generation condition to obtain the initial scores of the target clips satisfying the video cover generation condition.

In some embodiments, the video cover generation condition is a video cover generation condition customized by the user. In one example, a user customizes video covers to feature celebrity A and coffee drinking.

In some embodiments, if the video cover generation condition of the client is received, first, the target clips that need to be weighted are determined based on the dimension tags of the target clips in the target clip sequence. Using the example above-described, the target clip featuring celebrity A and coffee drinking is obtained by querying based on the dimension tags of the target clips, after which the target clip is weighed to obtain the initial score of the target clip.

In some embodiments, when the video cover generation condition of the client is received, weighting the scores of target clips associated with a video category of the video and generating the video cover based on a weighting process result includes: denoting the first target clips satisfying the video cover generation condition as the third target clips, and the first target clips not satisfying the video cover generation condition as the fourth target clips; weighting the initial scores of the third target clips to obtain the target scores of the third target clips, and the scores of the fourth target clips to obtain the target scores of the fourth target clips; denoting the second target clips satisfying the video cover generation condition as the fifth target clips, and the second target clips not satisfying the video cover generation condition as the sixth target clips; ranking the third target clips, the fourth target clips, the fifth target clips, and the sixth target clips based on the target scores of the third target clips, the initial scores of the fourth target clips, the initial scores of the fifth target clips, and the scores of the sixth target clips; and generating the video cover based on a ranking result. Here, the first target clips and the second target clips constitute the target clip sequence; the third target clips and the fourth target clips constitute the first target clips; the fifth target clips and the sixth target clips constitute the second target clips; and the first target clips are associated with the video category of the video.

In one example, a sequence of target clips is a collection of [target clip 1, . . . , target clip 10]. Also in this example, the first target clips associated with the video category of the video are [target clip 1, target clip 3, target clip 5]; the second target clips are [target clip 2, target clip 4, target clip 6, target clip 7, target clip 8, target clip 9, target clip 10]; while the target clips satisfying the video cover generation condition are [target clip 1, target clip 3, target clip 6, target clip 8].

In this example, among the first target clips, the third target clips satisfying the video cover generation condition are [target clip 1, target clip 3], and the fourth target clip not satisfying the video cover generation condition is [target clip 5]. Among the second target clips, the fifth target clips satisfying the video cover generation condition are [target clip 6, target clip 8], and the sixth target clips not satisfying the video cover generation condition are [target clip 2, target clip 4, target clip 7, target clip 9, target clip 10].

In implementations, first, the scores of the target clips satisfying the video cover generation condition are weighted to obtain the initial scores for [target clip 1, target clip 3, target clip 6, target clip 8]. Next, second weighting is performed on the initial scores of [target clip 1, target clip 3] associated with the video category of the video to obtain the target scores for [target clip 1, target clip 3], and first weighting is performed on the score of [target clip 5] associated with the video category of the video to obtain the target score for [target clip 5]. Lastly, [target clip 1, . . . , target clip 10] in the target clip sequence are ranked based on the target scores of [target clip 1, target clip 3, target clip 5], the initial scores of [target clip 6, target clip 8], and the scores of [target clip 2, target clip 4, target clip 7, target clip 9, target clip 10] to obtain the ranking result and generate the video cover.

With the methods for video cover generation provided by embodiments of the disclosure, after a video for processing and a processing request submitted by a client are received, video frames for processing are segmented into target clips of different types based on the processing request. Subsequently, the target clips are scored. With the participation of the user, the target clips customized by the user are first weighted based on the user's request. Next, based on the video category of the video, a target clip(s) associated with the video category of the most interest to the user is weighted again, and a video cover of the video is generated based on the target clip(s). This way, video cover generation is performed in an interactive manner, generating a video cover that draws more attention of users to the video and increases a click rate on the video, at the same time satisfying the user's request.

In some embodiments, to enhance the interactive experience for the user, after the video cover is generated, the video cover is sent to the user for displaying on a client.

In one embodiment, after weighting the scores of target clips associated with a video category of the video and generating the video cover based on a weighting result, the method further includes sending the video cover to the client, and displaying the video cover on the client.

In some embodiments, sending the video cover to the client provides the effect of a secondary verification: if the user on the client is satisfied with the generated video cover, the user confirms and submits the video cover. If the user is not satisfied with the generated video cover, the generated video cover can be re-adjusted. This way, the user is given time for consideration, thereby improving the user experience.

In some embodiments, after sending the video cover to the client and displaying the video cover on the client, the method further includes receiving a modification instruction from the client, and adjusting the video cover based on the modification instruction.

In some embodiments, after the modification instruction from the client is received, a template customized by the user is re-adjusted. The user on the client re-adjusts the video cover generation condition. Next, the target clip satisfying the re-adjusted video cover generation condition is weighted, after which the associated target clips are weighted again based on the video category. As such, a new video cover is generated based on a weighting process result until the user is satisfied.

With the methods for video cover generation provided by embodiments of the disclosure, after a video cover is generated, the video cover is displayed to a user, the video cover re-adjustable based on a request of the user, thereby increasing the user's engagement and providing the user with a highly interactive experience.

Figure 4:
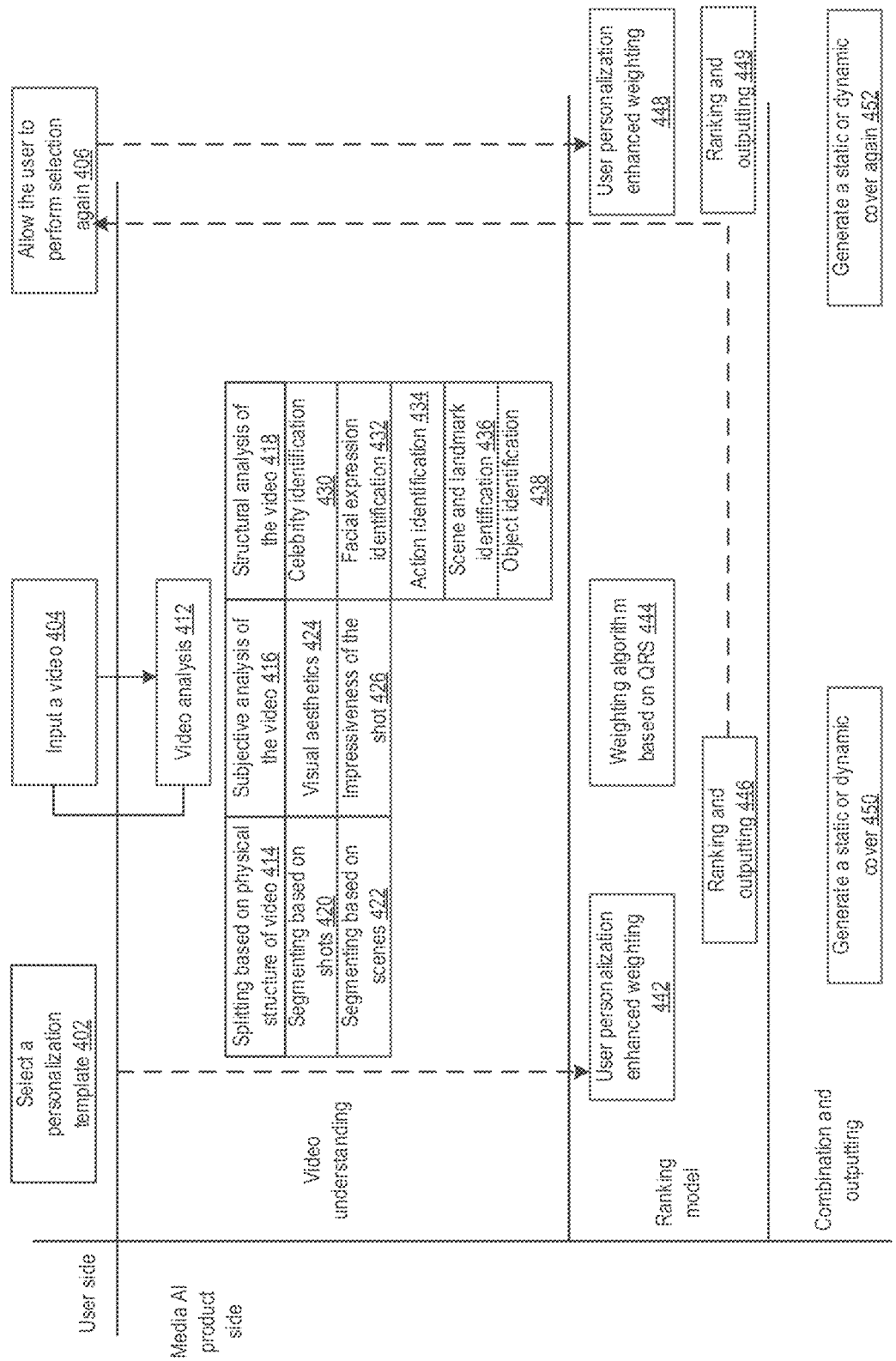
FIG. 4 is a flow diagram illustrating an application scenario of video cover generation according to some embodiments of the disclosure.

FIG. 4 is a flow diagram illustrating an application scenario of video cover generation, according to some embodiments of the disclosure. In some embodiments and as shown herein, the method for video cover generation includes the following steps.

Step I: a user selects (402) a personalization template, and inputs (404) a video.

Figure 5:
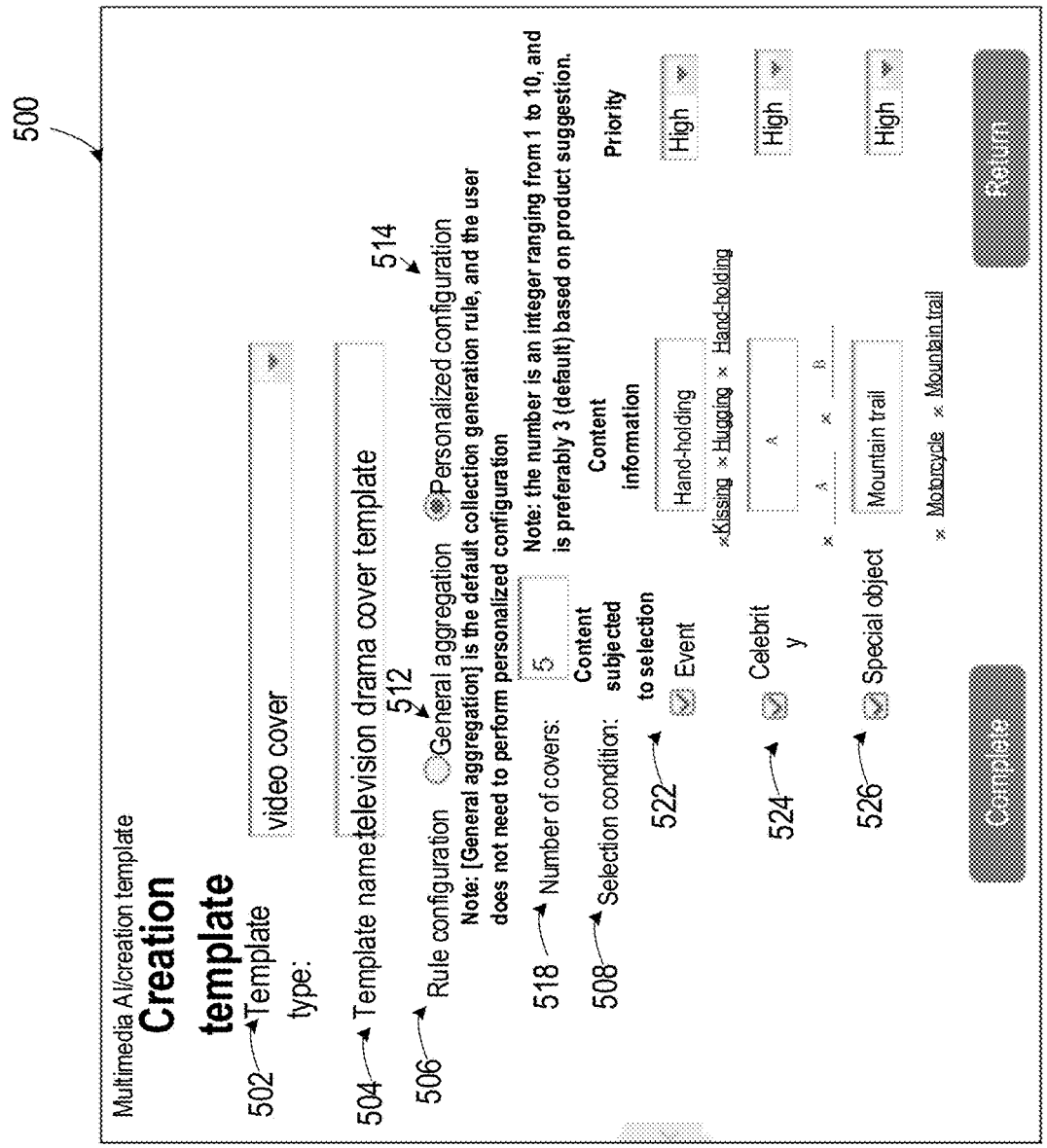
FIG. 5 is a block diagram illustrating a user interface of a personalization template according to some embodiments of the disclosure.

Referring now to FIG. 5, a personalization template selected by the user is illustrated herein. As shown in this example, the personalization template (500) is displayed when a format request from the user for a video cover is a dynamic request. Here, the user selects, via the personalization template (500), a template type (502) and customized template name (504). If the user selects the general aggregation option (512) in rule configuration section (506), content such as the number of covers (518), selection condition section (508), and the like, is not provided below the general aggregation option (512) of the personalization template (500). If the user selects the personalized configuration option (514) in the rule configuration section (506), content such as the number of covers (518), selection conditions (508), and the like is provided below the general aggregation option (512) of the personalization template (500). In the latter case, the user needs to customize the content himself or herself. In the example illustrated here, the personalization template (500) includes, in the selection condition section (508), a scene option (522) of "hand-holding"; a celebrity option (524) of "A"; and a special object options (526) of "mountain roads."

Step II: analyze (412) the video input by the user.

In some embodiments, analyzing the video input by the user includes: splitting the physical structure of the video to perform shot segmenting (420) or video frame segmenting (422) for the video. Next, subjective analysis (416) is performed on the video to obtain a score of a degree of impressiveness (426) for each shot and an aesthetic score (424) for each video frame. Lastly, structural analysis (418) is performed on the video. That is, intelligent tagging is performed on the segmented shots or video frames based on dimensions such as celebrity identification (4430), facial expression identification (432), action identification (434), scene and landmark identification (436), and object identification (438) (e.g., tagging the shots or video frames).

Step III: assign weights to the segmented shots or video frames based on the content of the personalization template (442) and a video category of the video (446), rank the segmented shots or video frames (446) based on a weighting process result, and output (448) a ranking result.

In some embodiments, enhanced weighting based on user personalization (442) is performed first. That is, based on the conditions customized by the user via the personalization template (e.g., the selection condition options of FIG. 5), shots or video frames satisfying the customized conditions are weighted. Next, weighting is performed based on a query related search (QRS) weighting method. In one example, the video category of the current video is intelligently analyzed using a query related search (QRS) method to automatically generate a weight for each dimension. Next, the shots or video frames associated with the video category of the current video are weighted, and then ranked in descending order. Lastly, the ranked shots or video frames are output. That is, a ranking result for the segmented shots or video frames is output.

Step IV: generate a static or dynamic video cover (450) based on the ranking result.

In some embodiments, after the ranking result of the shots or video frames is obtained, five static or dynamic video covers are generated based on a user request, as shown in the example illustrated in FIG. 5.

In some embodiments, if five static video covers need to be generated, the first five video frames are selected as the static video covers. If five dynamic video covers need to be generated, the first five shots are selected as the dynamic video covers.

Step V: send and display the generated video cover to the user, where the user is allowed to perform selections again (406) if not satisfied with the generated video cover.

In some embodiments, after the user obtains the generated video covers, if the user is satisfied with none of the video covers, the user re-adjusts the personalization template in FIG. 5.

Step VI: after the user re-adjusts the personalization template, a second ranking result of shots or video frames is output after weighting.

In some embodiments, enhanced weighting based on user personalization (448) is performed; the personalization template is re-adjusted; the shots or video frames are re-ranked after weighting (449); and the re-ranked shots or video frames are output (449). That is, a second ranking result of the shots or video frames is output.

Step VII: generate a static or dynamic video cover for the second time (452).

In some embodiments, after the second ranking result of the shots or video frames is obtained, N number of static or dynamic video covers are generated based on the user's request.

With the methods for video cover generation provided by embodiments of the disclosure after a video for processing and a processing request submitted by a user are received, video frames for processing are segmented into target clips of different types, based on the processing request. Next, the target clips are scored. With the participation of the user, target clips customized by the user are first weighted based on a user request. Then, based on a video category of the video, target clip(s) associated with a video category of most interest to the user is (are) weighted again, and a video cover of the video is generated based on the target clip(s). This way, intelligent video cover generation generates, in an interactive manner, a video cover that attracts more user attention to the video and increases a click rate at the video, at the same time satisfying the user's request.

In some embodiments, if the user is not satisfied with the generated video cover, video cover re-adjustment and generation is implemented via customization until the user is satisfied with the generated video cover, thereby enhancing the user's interactive experience.

Figure 6:
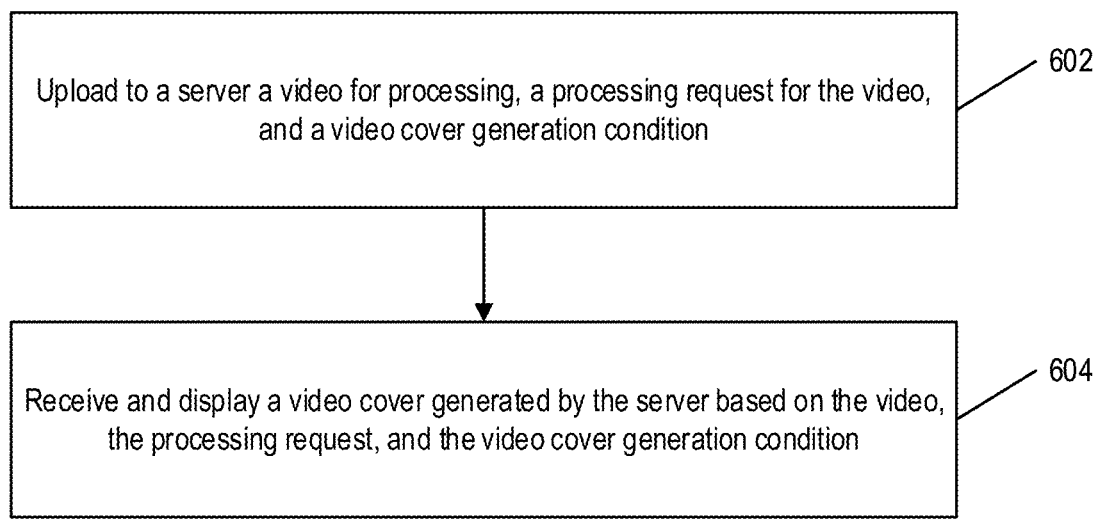
FIG. 6 is a flow diagram illustrating a method for video cover generation at a client according to some embodiments of the disclosure.

FIG. 6 is a flow diagram illustrating a method for video cover generation at a client, according to some embodiments of the disclosure. In some embodiments and as shown herein, the method for video cover generation includes the following steps.

Step 602: upload to a server a video for processing, a processing request for the video, and a video cover generation condition.

Step 604: receive and display a video cover generated by the server based on the video, the processing request, and the video cover generation condition.

In some embodiments, after receiving a video cover generated by the server based on the video, the processing request, and the video cover generation condition, the method further includes: uploading to the server a modification instruction generated based on the video cover; and receiving the video cover adjusted by the server based on the modification instruction.

The method for video cover generation provided by embodiments of the disclosure includes: uploading to a server a video for processing, a processing request for the video, and a video cover generation condition; and receiving and displaying a video cover generated by the server based on the video, the processing request, and the video cover generation condition. This way, participation of a user is achieved, and a request of the user is satisfied to a maximized extent, thereby improving the user's experience.

In some embodiments, a method for edited video generation includes: using any one of the above-described methods for video cover generation to generate edited-videos. In implementations, details for generating edited videos that are substantially similar to those above-described with connection to embodiments of video cover generation are not repeated herein.

Figure 7:
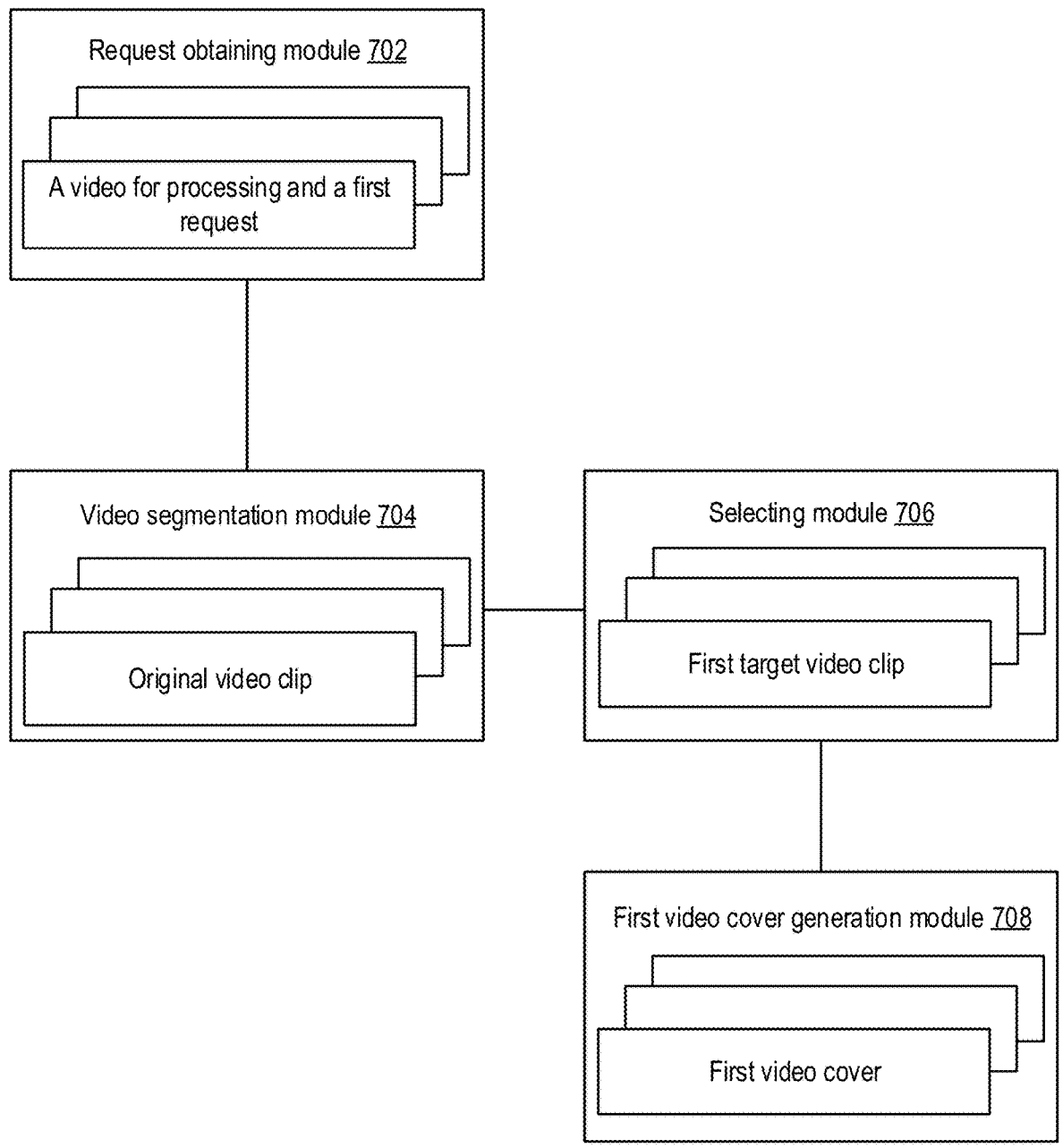
FIG. 7 is a block diagram illustrating an apparatus for data processing according to some embodiments of the disclosure.

FIG. 7 is block diagram illustrating an apparatus for data processing according to some embodiments of the disclosure. In some embodiments and as shown in FIG. 7, the apparatus includes: a request obtaining module (702), a video segmentation module (704), a selecting module (706), and a first video cover generation module (708).

The request obtaining module (702) is configured to obtain a video for processing and a first request.

The video segmentation module (704) is configured to segment the video to obtain one or more original video clips.

The selecting module (706) is configured to select, based on the first request, one or more first target video clips from the one or more original video clips.

The first video cover generation module (708) is configured to generate a first video cover based on the one or more first target video clips.

In some embodiments, the first request is preconfigured or is input by the user.

In some embodiments, the apparatus further includes a second request obtaining module configured to obtain a second request based on the user's input; a second target video clip selecting module configured to select, based on the second request, one or more second target video clips from the one or more original video clips; and a second video cover generation module configured to generate a second video cover based on the one or more second target video clips.

In some embodiments, the apparatus further includes a video cover displaying module configured to simultaneously display the first video cover and the second video cover.

Details about the apparatus for data processing that are substantially similar to the above-described embodiments for video cover generation are not repeated herein.

Figure 8:
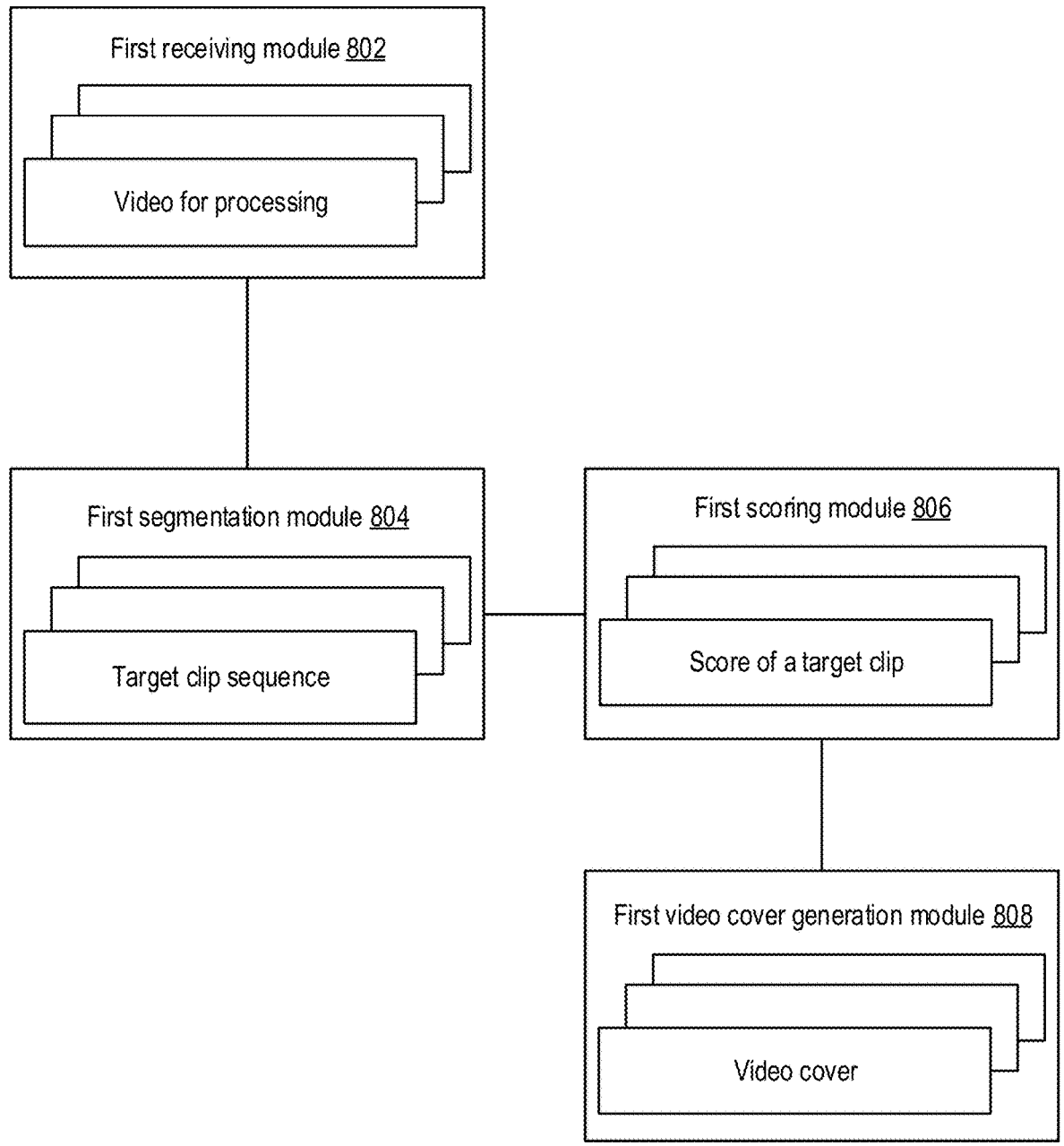
FIG. 8 is a block view illustrating an apparatus for video cover generation according to some embodiments of the disclosure.

FIG. 8 is a block diagram illustrating an apparatus for video cover generation according to some embodiments of the disclosure. In some embodiments and as shown in FIG. 8, the apparatus includes a first receiving module (802), a first segmentation module (804), a first scoring module (806), and a first video cover generation module (808).

The first receiving module (802) is configured to receive a video for processing, a processing request for the video, and a video cover generation condition.

The first segmentation module (804) is configured to segment the video based on the processing request to obtain a sequence of target clips.

The first scoring module (806) is configured to score the target clips in the sequence of target clips based on a preconfigured algorithm to obtain the scores for the target clips.

The first video cover generation module (808) is configured to, after weighting the scores of target clips satisfying the video cover generation condition, weight the scores of the target clips associated with a video category of the video; and generate the video cover based on a weighting process result.

In some embodiments, the first video cover generation module (808) is further configured to: weight the target clips satisfying the video cover generation condition to obtain the initial scores for the target clips satisfying the video cover generation condition.

In some embodiments, the first video cover generation module (808) is further configured to: denote first target clips satisfying the video cover generation condition as the third target clips, and the first target clips not satisfying the video cover generation condition as the fourth target clips; weight the initial scores of the third target clips to obtain the target scores of the third target clips, and the scores of the fourth target clips to obtain the target scores of the fourth target clips; denote the second target clips satisfying the video cover generation condition as the fifth target clips, and second target clips not satisfying the video cover generation condition as the sixth target clips; rank the third target clips, the fourth target clips, the fifth target clips, and the sixth target clips based on the target scores of the third target clips, the initial scores of the fourth target clips, the initial scores of the fifth target clips, and the scores of the sixth target clips; and generate the video cover based on a ranking result, where the first target clips and the second target clips constitute the target clip sequence; the third target clips and the fourth target clips constitute the first target clips; the fifth target clips and the sixth target clips constitute the second target clips; and the first target clips are associated with the video category of the video.

Details about the apparatus for video cover generation that are substantially similar to the above-described methods for video cover generation are not repeated herein.

Figure 9:
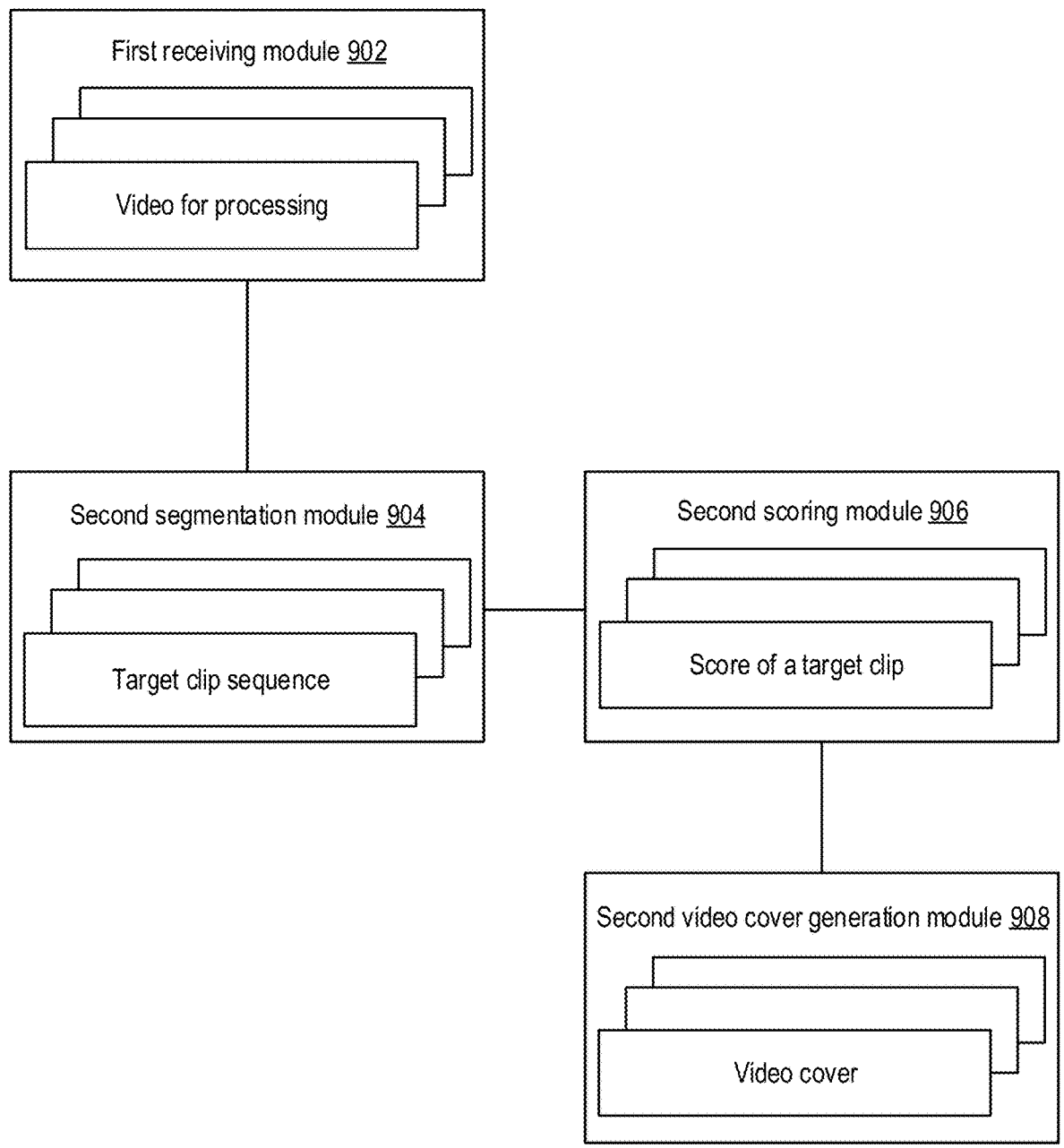
FIG. 9 is a block diagram illustrating an apparatus for video cover generation at a server according to some embodiments of the disclosure.

FIG. 9 is a block diagram illustrating an apparatus for video cover generation at a server, according to some embodiments of the disclosure. In some embodiments and as shown in FIG. 9, the apparatus includes: a second receiving module (902), a second segmentation module (904), a second scoring module (906), and a second video cover generation module (908).

The second receiving module (902) is configured to receive a video for processing uploaded by a client and a processing request for the video from the client.

The second segmentation module (904) is configured to segment the video based on the processing request to obtain a sequence of target clips.

The second scoring module (906) is configured to score the target clips in the sequence of target clips based on a preconfigured algorithm to obtain scores of the target clips.

The second video cover generation module (908) is configured to weight the scores of the target clips associated with a video category of the video, and to generate the video cover based on a weighting process result.

In some embodiments, the second video cover generation module (908) is further configured to: weight the scores of first target clips in the target clip sequence associated with the video category of the video to obtain target scores of the first target clips; ranking, based on the scores of the second target clips in the target clip sequence and the target scores of the first target clips, the first target clips and the second target clips; and generate the video cover based on a ranking result, where the first target clips and the second target clips constitute the target clip sequence.

In some embodiments, the apparatus further includes a customization module configured to, if a video cover generation condition of the client is received, weight the target clips in the sequence of target clips satisfying the video cover generation condition to obtain the initial scores of the target clips satisfying the video cover generation condition.

In some embodiments, the second video cover generation module (908) is further configured to: denote the first target clips satisfying the video cover generation condition as the third target clips, and the first target clips not satisfying the video cover generation condition as the fourth target clips; weight the initial scores of the third target clips to obtain the target scores of the third target clips, and the scores of the fourth target clips to obtain the target scores of the fourth target clips; denote the second target clips satisfying the video cover generation condition as the fifth target clips, and the second target clips not satisfying the video cover generation condition as the sixth target clips; rank the third target clips, the fourth target clips, the fifth target clips, and the sixth target clips based on the target scores of the third target clips, the initial scores of the fourth target clips, the initial scores of the fifth target clips, and the scores of the sixth target clips; and generate the video cover based on a ranking result, where the first target clips and the second target clips constitute the target clip sequence; the third target clips and the fourth target clips constitute the first target clips; the fifth target clips and the sixth target clips constitute the second target clips; and the first target clips are associated with the video category of the video.

In some embodiments, the apparatus further includes a tag configuration module configured to configure dimension tags for the target clips in the target clip sequence based on preconfigured dimensions.

In some embodiments, the apparatus further includes: a video dimension obtaining module configured to obtain a video dimension, where a degree of preference of the video dimension to the video category of the video is greater than a preconfigured preference threshold; and an associated target clip determining module configured to determine, based on a matching relationship between the video dimension and the dimension tags of the target clips, the target clips associated with the video category of the video.

In some embodiments, the second segmentation module (904) is further configured to determine a segmentation method for the video based on the processing request; and segment the video based on the segmentation method to obtain the target clip sequence.

In some embodiments, the processing request includes a format request of the client for the video cover that is static.

In some embodiments, if the format request of the client for the video cover is static, the second segmentation module (904) is further configured to: determine a video frame segmentation method for the video based on the static request on the video cover; and segment the video based on the video frame segmentation method to obtain a target video frame sequence.

In some embodiments, the processing request includes a format request of the client for the video cover that is dynamic.

In some embodiments, if the format request of the client for the video cover is dynamic, the second segmentation module (904) is further configured to: determine a shot segmentation method for the video based on the dynamic request on the video cover; and segment the video based on the shot segmentation method to obtain a target shot sequence.

In some embodiments, the apparatus further includes a video cover displaying module configured to send the video cover to the client, and display the video cover on the client.

In some embodiments, the apparatus further includes a video cover re-adjustment module configured to receive a modification instruction from the client; and adjust the video cover based on the modification instruction.

In the apparatus for video cover generation provided by the embodiment of the disclosure, a video for processing uploaded by a user is segmented; target clips resulting from segmentation are scored. Next, target clips are weighted and ranked based on a category of the video. Therefore, without a user's participation, a video cover capable of attracting more user attention and increasing a click rate of a video is automatically generated based on the category of the video.

Details about the apparatus for video cover generation that are substantially similar to the above-described methods for video cover generation are not repeated herein.

Figure 10:
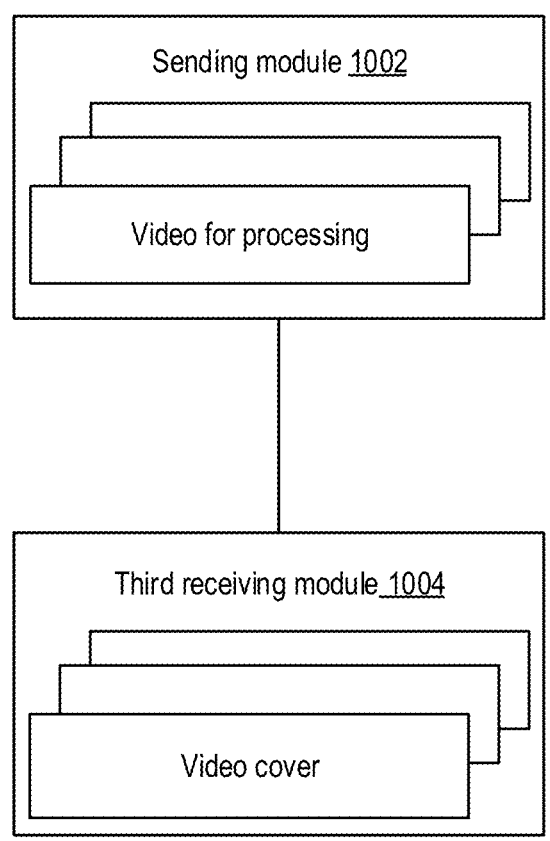
FIG. 10 is a block diagram illustrating an apparatus for video cover generation at a client according to some embodiments of the disclosure.

FIG. 10 is a block diagram illustrating an apparatus for video cover generation at a client, according to some embodiments of the disclosure. In some embodiments and as shown in FIG. 10, the apparatus includes a sending module (1002) and a third receiving module (1004).

The sending module (1002) is configured to upload to a server a video for processing, a processing request for the video, and a video cover generation condition.

The third receiving module (1004) is configured to receive and display a video cover generated by the server based on the video, the processing request, and the video cover generation condition.

In some embodiments, the apparatus further includes an adjustment module configured to receive a modification instruction from the client; and adjust the video cover based on the modification instruction.

Details about the computing device that are substantially similar to the above-described methods for video cover generation are not repeated herein.

Figure 11:
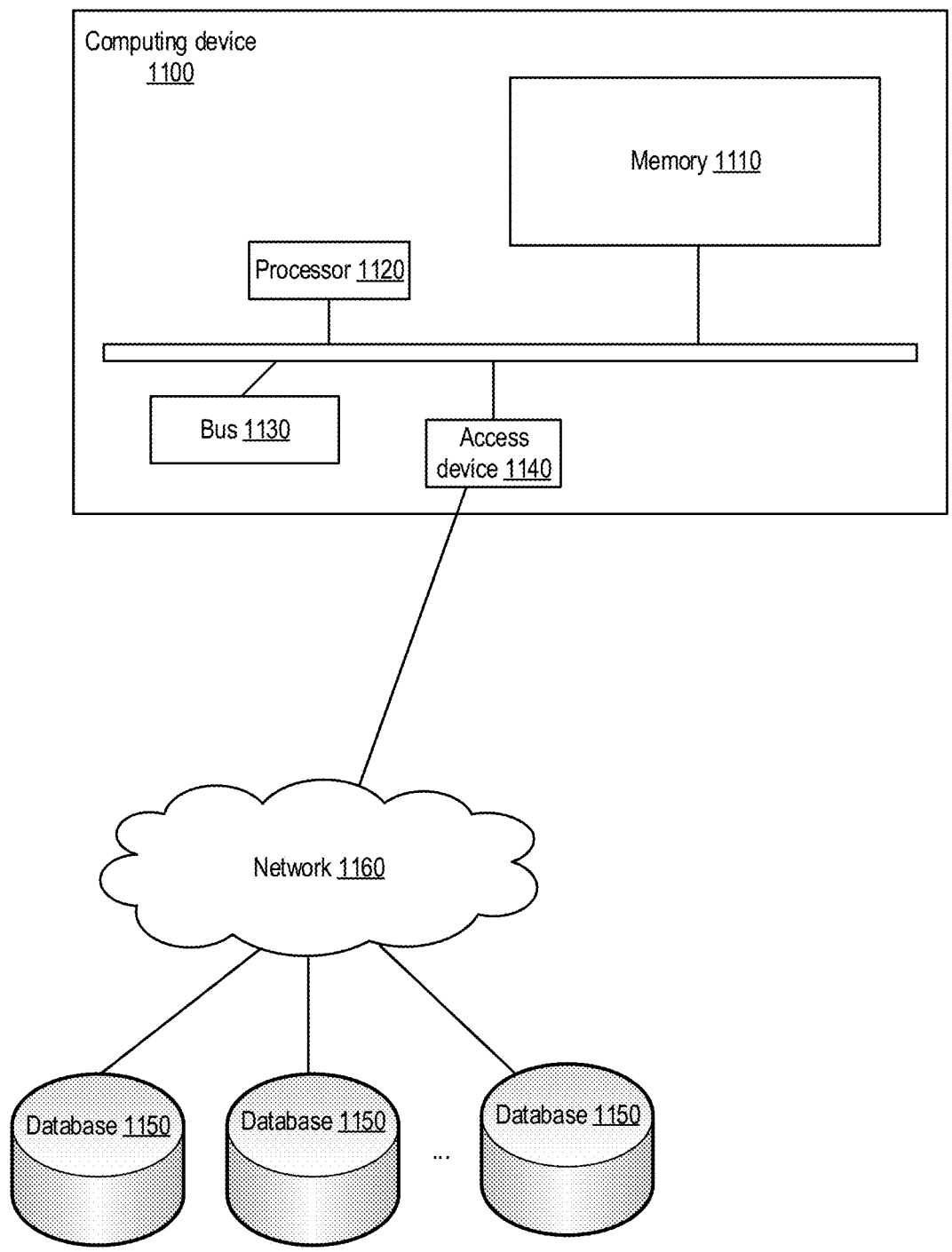
FIG. 11 is a block diagram of a computing device according to some embodiments of the disclosure.

FIG. 11 is a block diagram illustrating a computing device according to some embodiments of the disclosure. In some embodiments and as shown herein, the computing device (1100) includes: a memory (1110) and a processor (1120.) In this example, the processor (1120) is connected to the memory (1110) via a bus (1130); and a database (1150) is configured to store data.

In some embodiments, the computing device (1100) further includes an access device (1140). The access device (1140) enables the computing device (1100) to communicate via one or more networks (1060). Examples of these networks include a public switched telephone network (PSTN), a local area network (LAN), a wide area network (WAN), a personal area network (PAN), or a combination of communication networks, such as the Internet. The access device (1140) may include one or more of any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth interface, a near field communication (NFC) interface, etc.

In an embodiment of the disclosure, the aforementioned components and other components not shown in FIG. 11 of the computing device (1100) can be connected to each other via, for example, the bus (1130). It should be appreciated that the block diagram of the computing device shown in FIG. 11 is only exemplary, and is not intended to limit the scope of the disclosure. Those skilled in the art can add other components or substitute components as required.

The computing device (1100) may be any type of stationary or mobile computing device, including a mobile computer or mobile computing device (e.g., a tablet, a personal digital assistant, a laptop computer, a notebook computer, a netbook, etc.), a mobile phone (e.g., a smart phone), a wearable computing device (e.g., a smart watch, smart glasses, etc.), or other types of mobile devices, or a stationary computing device such as a desktop computer or a PC. The computing device (1100) may also be a mobile or stationary server.

The processor (1120) is configured to execute the following computer-executable instructions: obtaining a video for processing and a first request; segmenting the video to obtain one or more original video clips; selecting, based on the first request, one or more first target video clips from the one or more original video clips; and generating a first video cover based on the one or more first target video clips.

Details about the computing device are substantially similar to the above-described methods for video cover generation are not repeated herein.

Figure 12:
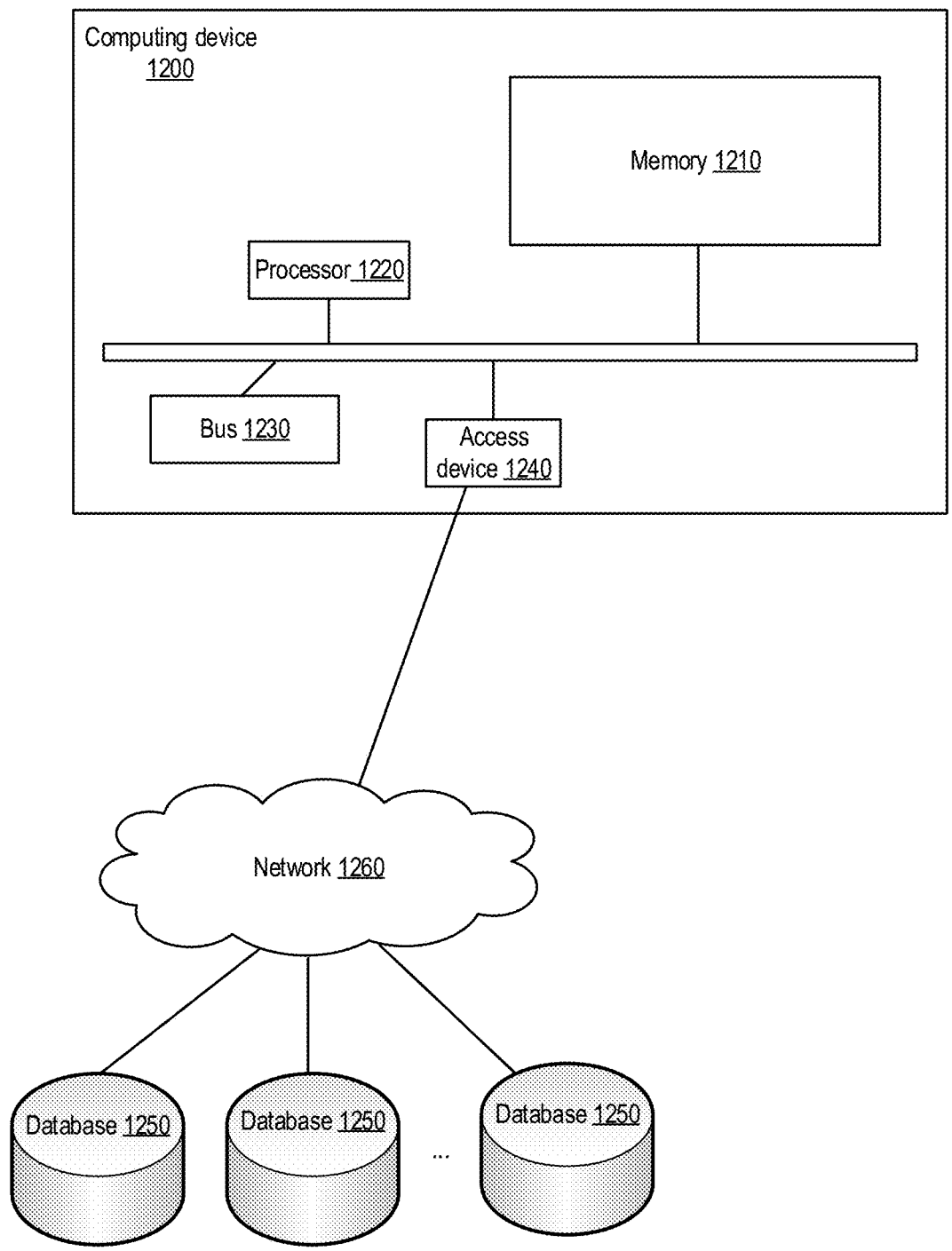
FIG. 12 is a block diagram of a computing device according to some embodiments of the disclosure.

FIG. 12 is a block diagram of a computing device according to some embodiments of the disclosure. In some embodiments and as shown herein, the computing device (1200) includes: a memory (1210) and a processor (1220). In this example, the processor (1220) is connected to the memory (1210) via a bus (1230); while a database (1250) is configured to store data.

In some embodiments, the computing device (1200) further includes an access device (1240). The access device (1240) enables the computing device (1200) to communicate via one or more networks (1260). Examples of these networks include a public switched telephone network (PSTN), a local area network (LAN), a wide area network (WAN), a personal area network (PAN), or a combination of communication networks, such as the Internet. The access device 1240 may include one or more of any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth interface, a near field communication (NFC) interface, etc.

In an embodiment of the disclosure, the aforementioned components and other components not shown in FIG. 12 of the computing device (1200) can be connected to each other via, for example, the bus. It should be appreciated that the block diagram of the computing device shown in FIG. 12 is only exemplary, and is not intended to limit the scope of the disclosure. Those skilled in the art can add or substitute other components as required.

The computing device (1200) may be any type of stationary or mobile computing device, including a mobile computer or mobile computing device (e.g., a tablet, a personal digital assistant, a laptop computer, a notebook computer, a netbook, etc.), a mobile phone (e.g., a smart phone), a wearable computing device (e.g., a smart watch, smart glasses, etc.), or other types of mobile devices, or a stationary computing device such as a desktop computer or a PC. The computing device 1200 may also be a mobile or stationary server.

In some embodiments, the processor (1220) is configured to execute the following computer-executable instructions: receiving a video for processing, a processing request for the video, and a video cover generation condition; segmenting the video based on the processing request to obtain a sequence of target clips; scoring target clips in the sequence of target clips based on a preconfigured algorithm to obtain scores of the target clips; after weighting the scores of target clips satisfying the video cover generation condition, weighting the scores of target clips associated with a video category of the video; and generating the video cover based on a weighting process result.

Details about the computing device that are substantially similar to the above-described methods for video cover generation are not repeated herein.

Figure 13:
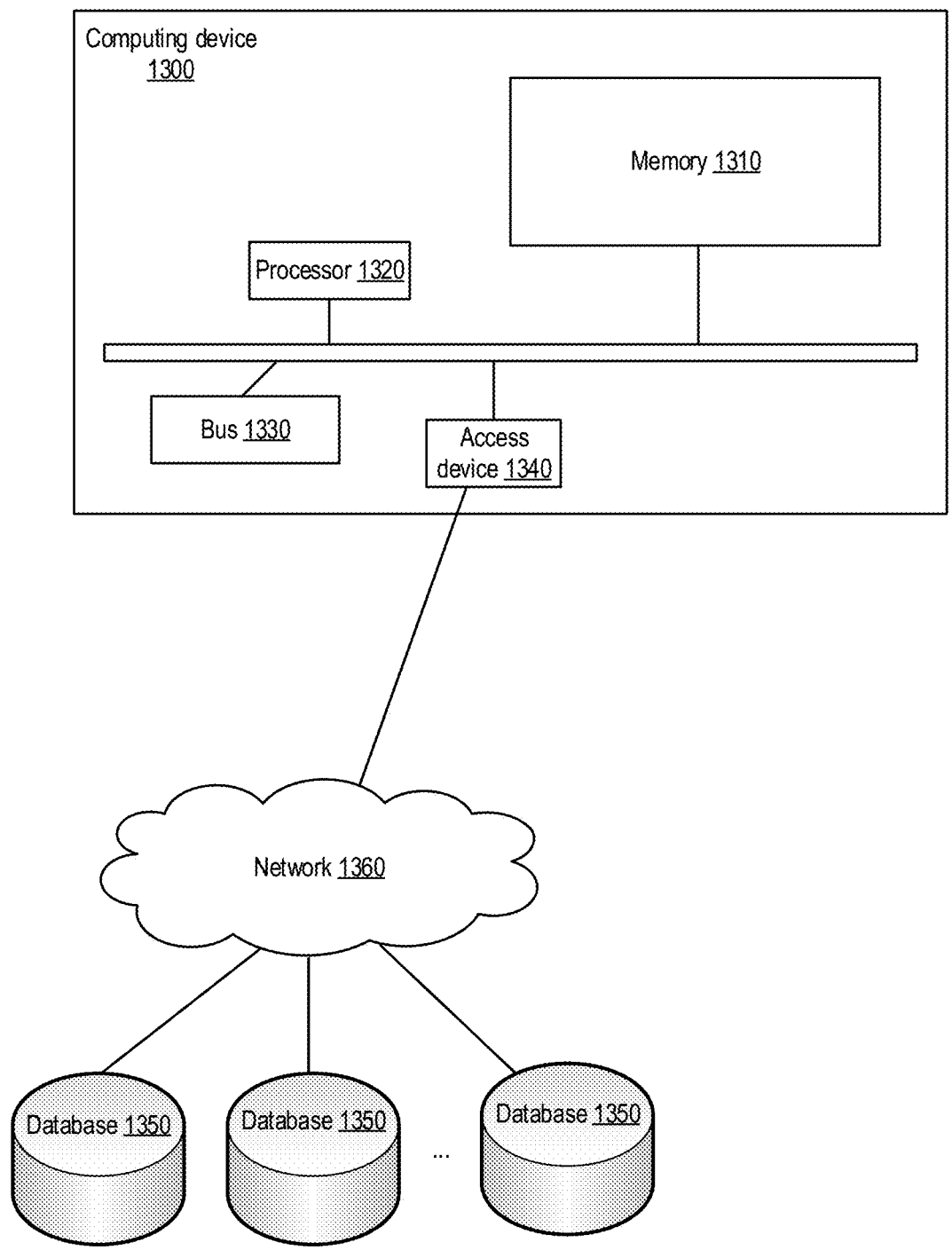
FIG. 13 is a block diagram of a computing device according to some embodiments of the disclosure.

FIG. 13 is a block diagram of a computing device according to some embodiments of the disclosure. In some embodiments and as shown herein, the computing device (1300) includes: a memory (1310) and a processor (1320). In this example, the processor (1320) is connected to the memory (1310) via a bus (1330); while a database (1350) is configured to store data.

In some embodiments, the computing device (1300) further includes an access device (1340). The access device (1340) enables the computing device (1300) to communicate via one or more networks (1360). Examples of these networks include a public switched telephone network (PSTN), a local area network (LAN), a wide area network (WAN), a personal area network (PAN), or a combination of communication networks, such as the Internet. The access device 1(340) may include one or more of any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth interface, a near field communication (NFC) interface, etc.

In an embodiment of the disclosure, the aforementioned components and other components not shown in FIG. 13 of the computing device (1300) can be connected to each other via, for example, the bus. It should be appreciated that the block diagram of the computing device shown in FIG. 13 is only exemplary, and is not intended to limit the scope of the disclosure. Those skilled in the art can add other components or substitute components as required.

The computing device (1300) may be any type of stationary or mobile computing device, including a mobile computer or mobile computing device (e.g., a tablet, a personal digital assistant, a laptop computer, a notebook computer, a netbook, etc.), a mobile phone (e.g., a smart phone), a wearable computing device (e.g., a smart watch, smart glasses, etc.), or other types of mobile devices, or a stationary computing device such as a desktop computer or a PC. The computing device 1300 may also be a mobile or stationary server.

In some embodiments, the processor (1320) is configured to execute the following computer-executable instructions: receiving a video for processing uploaded by a client and a processing request from the client for the video; segmenting the video based on the processing request to obtain a target clip sequence; scoring target clips in the target clip sequence based on a preconfigured algorithm to obtain scores of the target clips; weighting the scores of target clips associated with a video category of the video; and generating the video cover based on a weighting result.

Details about the computing device are substantially similar to the above-described methods for video cover generation are not repeated herein.

Figure 14:
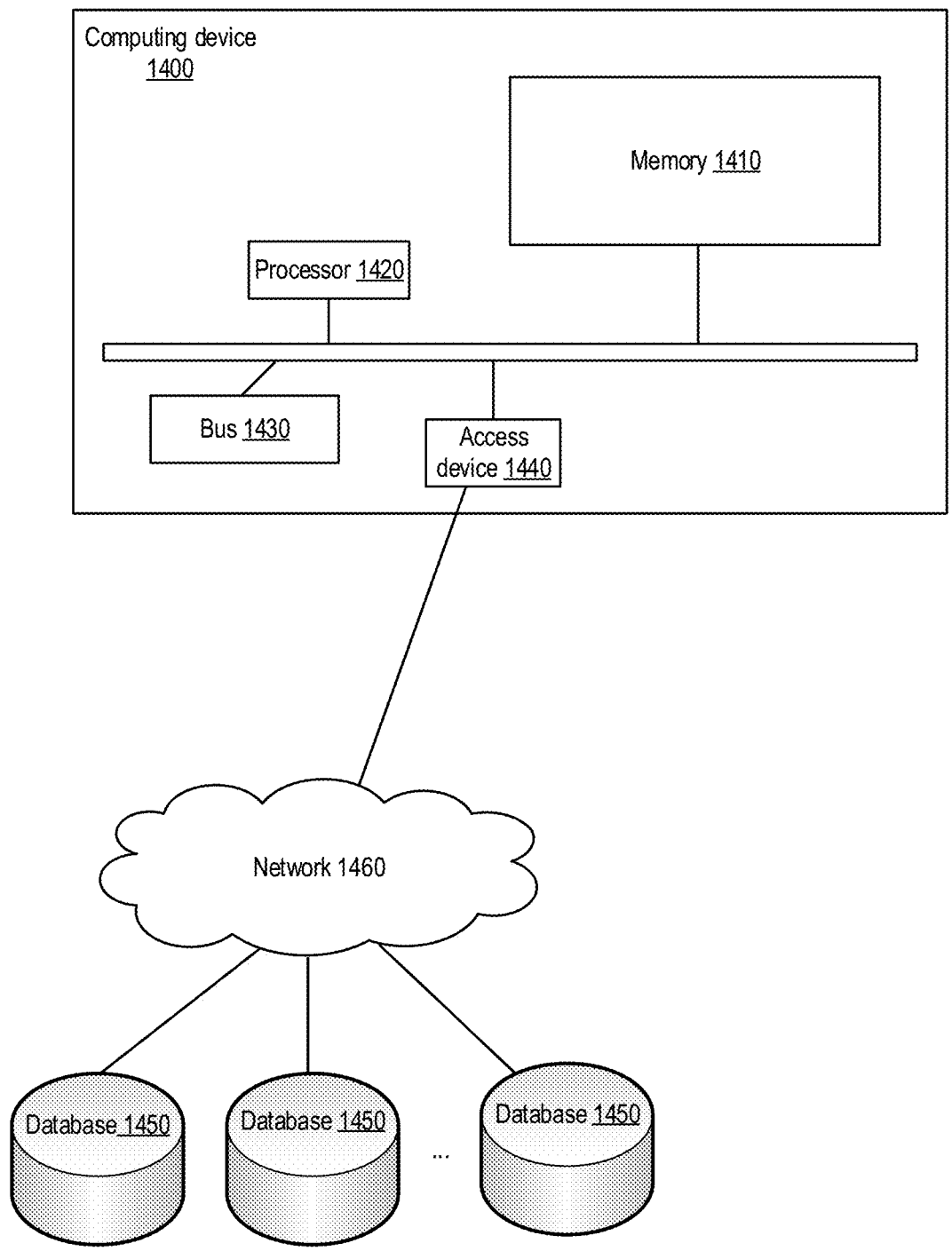
FIG. 14 is a block diagram of a computing device according to some embodiments of the disclosure.

FIG. 14 is a block diagram of a computing device according to some embodiments of the disclosure. In some embodiments and as shown herein, the computing device (1400) includes: a memory (1410) and a processor (1420). In this example, the processor (1420) is connected to the memory (1410) via a bus (1430); while a database (1450) is configured to store data.

In some embodiments, the computing device (1400) further includes an access device (1440). The access device (1440) enables the computing device 1400 to communicate via one or more networks (1460). Examples of these networks include a public switched telephone network (PSTN), a local area network (LAN), a wide area network (WAN), a personal area network (PAN), or a combination of communication networks, such as the Internet. The access device (1440) may include one or more of any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth interface, a near field communication (NFC) interface, etc.

In an embodiment of the disclosure, the aforementioned components and other components not shown in FIG. 14 of the computing device (1400) can be connected to each other via, for example, the bus. It should be appreciated that the block diagram of the computing device shown in FIG. 14 is only exemplary, and is not intended to limit the scope of the disclosure. Those skilled in the art can add other components or substitute components as required.

The computing device (1400) may be any type of stationary or mobile computing device, including a mobile computer or mobile computing device (e.g., a tablet, a personal digital assistant, a laptop computer, a notebook computer, a netbook, etc.), a mobile phone (e.g., a smart phone), a wearable computing device (e.g., a smart watch, smart glasses, etc.), or other types of mobile devices, or a stationary computing device such as a desktop computer or a PC. The computing device (1400) may also be a mobile or stationary server.

In some embodiments, the processor (1420) is configured to execute the following computer-executable instructions: uploading to a serving side a video for processing, a processing request for the video, and a video cover generation condition; and receiving and displaying a video cover generated by the serving side based on the video, the processing request, and the video cover generation condition.

Details about the computing device are substantially similar to the above-described methods for video cover generation are not repeated herein.

An embodiment of the disclosure further provides a computer-readable storage medium, for storing computer instructions, where when executed by a processor, the instructions implement the steps of the methods for video cover generation, the methods for video cover generation applied to a server, and the methods for video cover generation applied to a client.

Details about the computer-readable storage medium are substantially similar to the above-described methods are not repeated herein.

The specific embodiments in the description of the disclosure have been described above. Other embodiments fall within the scope of the appended claims. In some cases, the actions or steps recited in the claims may be performed in a different order than in the embodiments and still achieve the desired results. In addition, the processes depicted in the drawings do not necessarily require the illustrated particular order or consecutive order to achieve the desired results. In some implementations, multitask processing and parallel processing are also possible or favorable.

The computer instructions may include computer program code. The computer program code may be in source code form, object code form, an executable file, or in some intermediate forms. The computer-readable medium may include: any entity or apparatus capable of carrying the computer program code, a recording medium, a USB flash disk, a removable hard disk, a magnetic disk, an optical disc, a computer storage device, a Read-Only Memory (ROM), a Random Access Memory (RAM), an electrical carrier signal, a telecommunication signal, a software distribution medium, etc. It should be noted that content included in the computer-readable medium can be appropriately added or reduced as required by legislation and the patent practice in the judicial district. For example, in some judicial districts, the computer-readable medium does not include an electrical carrier signal and a telecommunication signal as required by legislation and the patent practice.

It should be noted that in order to briefly describe each foregoing method embodiment, all the method embodiments are expressed as a combination of a series of actions. Those skilled in the art should know that the embodiments of the disclosure are not limited by the sequence of the described actions; certain steps can be applied with different sequences or can be carried out at the same time based on the embodiments of the disclosure. Secondly, those skilled in the art should also know that all the embodiments described in the specification belong to preferred embodiments; the related actions and modules are not necessarily needed for the embodiments of the disclosure.

In the embodiments, the description of each embodiment has its own focus. For parts that are not described in detail in a certain embodiment, reference can be made to the related descriptions of other embodiments.

The preferred embodiments of the disclosure disclosed above are merely intended to facilitate illustration of the disclosure. Optional embodiments do not describe all the details thoroughly, and do not restrict the present disclosure to be the specific implementations. Obviously, many modifications and changes can be made to the content of the embodiments of the disclosure. The disclosure selects and describes in detail these embodiments in order to better explain the principle and actual applications of the embodiments of the disclosure, so that those skilled in the art can better understand and utilize the disclosure. The disclosure is limited by only the claims and the whole scope and the equivalents thereof.

What is claimed is:

1. A method, comprising:
   obtaining a video and a first request;
   segmenting the video to obtain one or more original video clips;
   selecting, based on the first request, one or more first target video clips from the one or more original video clips;
   generating a first video cover based on the one or more first target video clips;
   obtaining an attribute feature of a user;
   generating a corresponding template for video cover generation for the user based on the attribute feature;
   receiving a second request based on the template for video cover generation; and
   generating a second video cover based on the second request.

2. The method of claim 1, further comprising:
   obtaining a feature associated with a historical video cover generated for a second user associated with the user;
   receiving the second request based on the feature associated with generating the historical video cover; and
   selecting, based on the second request, one or more second target video clips to generate the second video cover from the one or more original video clips.

3. The method of claim 2, further comprising simultaneously displaying the first video cover and the second video cover.

4. The method of claim 1, further comprising:
   receiving a video cover generation condition;
   segmenting the video based on the first request to obtain a sequence of target clips;
   scoring target clips in the sequence of target clips based on a pre-configured algorithm to obtain scores of the target clips;
   weighting the scores of the target clips based on a video category of the video; and
   generating the first video cover based on the weighting.

5. The method of claim 4, scores of target clips satisfying the video cover generation condition being weighted to obtain initial scores of the target clips satisfying the video cover generation condition.

6. The method of claim 5, the weighting the scores of target clips based on a video category of the video and generating the video cover based on the weighting comprising:
   denoting first target clips satisfying the video cover generation condition as third target clips;
   denoting the first target clips not satisfying the video cover generation condition as fourth target clips;
   weighting initial scores of the third target clips to obtain target scores of the third target clips;
   weighting scores of the fourth target clips to obtain target scores of the fourth target clips;
   denoting second target clips satisfying the video cover generation condition as fifth target clips;
   denoting the second target clips not satisfying the video cover generation condition as sixth target clips;
   ranking the third target clips, the fourth target clips, the fifth target clips, and the sixth target clips based on the target scores of the third target clips, the initial scores of the fourth target clips, the initial scores of the fifth target clips, and the scores of the sixth target clips; and
   generating the first video cover based on a ranking result, the first target clips and the second target clips constituting the sequence of target clips; the third target clips and the fourth target clips constituting the first target clips; the fifth target clips and the sixth target clips constituting the second target clips; and the first target clips associated with the video category of the video.

7. An apparatus comprising:
   a processor; and
   a storage medium for tangibly storing thereon program logic for execution by the processor, the stored program logic comprising:
   logic, executed by the processor, for obtaining a video and a first request,
   logic, executed by the processor, for segmenting the video to obtain one or more original video clips,
   logic, executed by the processor, for selecting, based on the first request, one or more first target video clips from the one or more original video clips,
   logic, executed by the processor, for generating a first video cover based on the one or more first target video clips,
   logic, executed by the processor, for obtaining an attribute feature of a user,
   logic, executed by the processor, for generating a corresponding template for video cover generation for the user based on the attribute feature,
   logic executed by the processor, for receiving a second request based on the template for video cover generation, and
   logic, executed by the processor, for generating a second video cover based on the second request.

8. The apparatus of claim 7, the stored program logic further comprising:
   logic, executed by the processor, for obtaining a feature associated with generating a historical video cover for a second user, the second user associated with the user,
   logic, executed by the processor, for receiving the second request based on the feature associated with generating the historical video cover, and
   the logic for selecting, based on the second request, one or more second target video clips to generate the second video cover from the one or more original video clips.

9. The apparatus of claim 7, the stored program logic further comprising:
   logic, executed by the processor, for simultaneously displaying the first video cover and a second video cover.

10. The apparatus of claim 7, the stored program logic further comprising:
    logic, executed by the processor, for receiving a video cover generation condition,
    logic, executed by the processor, for segmenting the video based on the first request to obtain a sequence of target clips,
    logic, executed by the processor, for scoring target clips in the sequence of target clips based on a pre-configured algorithm to obtain scores of the target clips,
    logic, executed by the processor, for weighting the scores of the target clips based on a video category of the video, and
    logic, executed by the processor, for generating the first video cover based on the weighting.

11. The apparatus of claim 10, scores of target clips satisfying the video cover generation condition being weighted to obtain initial scores of the target clips satisfying the video cover generation condition.

12. The apparatus of claim 11, the logic for weighting the scores of target clips based on a video category of the video, and generating the video cover based on the weighting comprising:
   logic, executed by the processor, for denoting first target clips satisfying the video cover generation condition as third target clips;
   logic, executed by the processor, for denoting the first target clips not satisfying the video cover generation condition as fourth target clips,
   weighting initial scores of the third target clips to obtain target scores of the third target clips,
   logic, executed by the processor, for weighting scores of the fourth target clips to obtain target scores of the fourth target clips,
   logic, executed by the processor, for denoting second target clips satisfying the video cover generation condition as fifth target clips,
   logic, executed by the processor, for denoting the second target clips not satisfying the video cover generation condition as sixth target clips,
   logic, executed by the processor, for ranking the third target clips, the fourth target clips, the fifth target clips, and the sixth target clips based on the target scores of the third target clips, the initial scores of the fourth target clips, the initial scores of the fifth target clips, and the scores of the sixth target clips, and
   logic, executed by the processor, for generating the first video cover based on a ranking result, the first target clips and the second target clips constituting the sequence of target clips; the third target clips and the fourth target clips constituting the first target clips; the fifth target clips and the sixth target clips constituting the second target clips; and the first target clips associated with the video category of the video.

13. A non-transitory computer-readable storage medium for tangibly storing computer program instructions capable of being executed by a computer processor, the computer program instructions defining the steps of:
   obtaining a video and a first request;
   segmenting the video to obtain one or more original video clips;
   selecting, based on the first request, one or more first target video clips from the one or more original video clips;
   generating a first video cover based on the one or more first target video clips;
   obtaining an attribute feature of a user;
   generating a corresponding template for video cover generation for the user based on the attribute feature;
   receiving a second request based on the template for video cover generation; and
   generating a second video cover based on the second request.

14. The computer-readable storage medium of claim 13, the computer program instructions further defining the steps of:
   obtaining a feature associated with a historical video cover generated for a second user associated with the user;
   receiving the second request based on the feature associated with generating the historical video cover; and
   selecting, based on the second request, one or more second target video clips to generate the second video cover from the one or more original video clips.

15. The computer-readable storage medium of claim 13, the computer program instructions further defining the steps of:
   receiving a video cover generation condition;
   segmenting the video based on the first request to obtain a sequence of target clips;
   scoring target clips in the sequence of target clips based on a pre-configured algorithm to obtain scores of the target clips;
   weighting the scores of the target clips based on a video category of the video; and
   generating the first video cover based on the weighting.

16. The computer-readable storage medium of claim 15, scores of target clips satisfying the video cover generation condition being weighted to obtain initial scores of the target clips satisfying the video cover generation condition.

17. The computer-readable storage medium of claim 16, the weighting the scores of target clips based on a video category of the video, and generating the video cover based on the weighting comprises:
   denoting first target clips satisfying the video cover generation condition as third target clips;
   denoting the first target clips not satisfying the video cover generation condition as fourth target clips;
   weighting initial scores of the third target clips to obtain target scores of the third target clips;
   weighting scores of the fourth target clips to obtain target scores of the fourth target clips;
   denoting second target clips satisfying the video cover generation condition as fifth target clips;
   denoting the second target clips not satisfying the video cover generation condition as sixth target clips;
   ranking the third target clips, the fourth target clips, the fifth target clips, and the sixth target clips based on the target scores of the third target clips, the initial scores of the fourth target clips, the initial scores of the fifth target clips, and the scores of the sixth target clips; and
   generating the first video cover based on a ranking result, the first target clips and the second target clips constituting the sequence of target clips; the third target clips and the fourth target clips constituting the first target clips; the fifth target clips and the sixth target clips constituting the second target clips; and the first target clips associated with the video category of the video.

* * * * *